US012681172B2

(12) United States Patent
Wu et al.

(10) Patent No.: US 12,681,172 B2
(45) Date of Patent: Jul. 14, 2026

(54) RADAR SYSTEM WITH OVERLAPPING VIRTUAL ANTENNAS FOR OUT-OF-FIELD-OF-VIEW DETECTION AND MULTIPATH DETECTION

(71) Applicant: NXP B.V., Eindhoven (NL)

(72) Inventors: Ryan Haoyun Wu, San Jose, CA (US); Baokun Liu, Novi, MI (US); Feike Guus Janser, Eindhoven (NL)

(73) Assignee: NXP B.V., Eindhoven (NL)

( * ) Notice: Subject to any disclaimer, the term of this patent is extended or adjusted under 35 U.S.C. 154(b) by 225 days.

(21) Appl. No.: 18/757,193

(22) Filed: Jun. 27, 2024

(65) Prior Publication Data

US 2026/0003072 A1    Jan. 1, 2026

(51) Int. Cl.
*G01S 13/931*        (2020.01)
*G01S 7/03*          (2006.01)
*G01S 13/90*         (2006.01)

(52) U.S. Cl.
CPC .............. *G01S 13/931* (2013.01); *G01S 7/03* (2013.01); *G01S 13/9004* (2019.05)

(58) Field of Classification Search
None
See application file for complete search history.

(56) References Cited

U.S. PATENT DOCUMENTS 11,092,683 B2 * 8/2021 Wu ........................ G01S 13/003
11,269,049 B2 * 3/2022 Wu ........................ G01S 13/931

11,520,030 B2 * 12/2022 Wu ........................ G01S 7/288
2014/0266868 A1 * 9/2014 Schuman ............ G01S 13/9029
                                                    342/25 R
2016/0131752 A1 * 5/2016 Jansen .................... G01S 13/42
                                                    342/27

(Continued)

FOREIGN PATENT DOCUMENTS

EP          2461178 A1 *  6/2012 ............. G01S 13/42
WO   WO2020/157007 A1 *  8/2020 ............. G01S 13/42

OTHER PUBLICATIONS

Arancibia; Implementation of a Sidelobe Blanking System on the AN/SPS-12 Radar; Master's Thesis, Naval Postgraduate School; 1977.

(Continued)

*Primary Examiner* — Bernarr E Gregory

(57)                ABSTRACT

A MIMO radar apparatus includes M simultaneously transmitting radar transmitters, N radar receivers, and control circuitry coupled thereto. Positions of the M transmitters and N receivers define M×N virtual transceiver positions; at least one virtual transceiver position coincides with another. The control circuitry transmits simultaneously radar output signals via the transmitters, receives radar return signals arising from the output signals via the receivers, and generates N corresponding electronic receiver signals, and can further generate M×N virtual transceiver signals and estimate angular positions of backscattering/backreflecting objects. Comparing signal characteristics arising from the same virtual transceiver position but from different corresponding transmitter/receiver pairs can enable identification of low-confidence estimated angular positions arising from out-of-field-of-view or multipath propagation of radar signals.

20 Claims, 24 Drawing Sheets

(56) References Cited

U.S. PATENT DOCUMENTS

| | | | |
|---|---|---|---|
| 2016/0146931 A1* | 5/2016 | Rao | G01S 13/931 |
| | | | 342/59 |
| 2019/0285738 A1* | 9/2019 | Iwasa | G01S 7/285 |
| 2020/0103515 A1* | 4/2020 | Kishigami | G01S 13/343 |
| 2021/0199760 A1 | 7/2021 | Izadian et al. | |

OTHER PUBLICATIONS

Jaffer et al; Resolution of Mainlobe and Sidelobe Detections Using Model Order Determination; Raytheon Corp 2002; released by Defense Technical Information Center; https://apps.dtic.mil/sti/citations/ADA405584.

Biallawons et al; Multipath Detection by Using Space-Space Adaptive Processing (SSAP) with MIMO Radar; 2018 International Conference on Radar (Radar), Brisbane, QLD, Australia, 2018, pp. 1-4; doi: 10.1109/RADAR.2018.8557221; https://ieeexplore.ieee.org/stamp/stamp.jsp?tp=&arnumber=8557221.

Feng et al; Multipath Ghost Classification for MIMO Radar Using Deep Neural Networks; 2022 IEEE Radar Conference (RadarConf22), New York City, NY, USA, 2022, pp. 1-6; doi: 10.1109/RadarConf2248738.2022.9764274; https://ieeexplore.ieee.org/document/9764274.

Li et al; Multipath Ghost Target Identification for Automotive MIMO Radar; 2022 IEEE 96th Vehicular Technology Conference (VTC2022-Fall), London, United Kingdom, 2022, pp. 1-5; doi: 10.1109/VTC2022-Fall57202.2022.10012904; https://ieeexplore.ieee.org/document/10012904.

Kato et al; Transmission Error Correction Using Overlapping Elements in Virtual Array of MIMO Radar; 2018 International Symposium on Antennas and Propagation (ISAP), Busan, Korea (South), 2018, pp. 1-2; https://ieeexplore.ieee.org/document/8627847.

Chen et al; Robust Phase Error Correction and Coherent Processing for Automotive TDMA-MIMO Radar; 2022 Photonics & Electromagnetics Research Symposium (PIERS), Hangzhou, China, 2022, pp. 617-623; doi: 10.1109/PIERS55526.2022.9792678; https://ieeexplore.ieee.org/document/9792678.

* cited by examiner

T1　T2　T3　T4

R1　R2　R3　R4

T1R1　T1R2
T1R3　T1R4
T2R1　T2R2
T2R3　T2R4
T3R1　T3R2
T3R3　T3R4
T4R1　T4R2
T4R3　T4R4

T1    T2    T3    T4

R1    R2    R3    R4

T1R1    T1R2
T1R3    T2R2    T2R3
T2R4/T3R1    T3R3    T3R2
T4R2    T4R4    T4R3
T1R4/T2R1    T3R4/T4R1

RADAR SYSTEM WITH OVERLAPPING VIRTUAL ANTENNAS FOR OUT-OF-FIELD-OF-VIEW DETECTION AND MULTIPATH DETECTION

FIELD OF THE INVENTION

The field of the present invention relates to multiple-input multiple-output (MIMO) radar apparatus and methods.

BACKGROUND

Automotive radar, typically operating at so-called millimeter wavelengths, has become an important component of self-driving automobiles and advanced driver assistant systems (ADAS). Common implementations include multiple-input multiple-output (MIMO) radar systems, in which multiple radar transmitters illuminate an area with multiple radar output signals, and backscattered or backreflected radar return signals arising from those radar output signals are detected by multiple radar receivers. A virtual transceiver array is formed with a number of virtual array elements equal to the product of the number of transmitters and the number of receivers. The increased aperture of a MIMO radar compared to a single-transmitter system increases the capability to separate objects based upon the Direction of Arrival (DoA) of signals reflected by those objects.

SUMMARY

An example embodiment of a multiple-input multiple-output (MIMO) radar apparatus includes radar control circuitry, a set of M radar transmitters, and a set of N radar receivers; the radar transmitters and receivers are operably coupled to the radar control circuitry. Corresponding relative positions of the M radar transmitters and the N radar receivers define a set of M×N virtual transceiver positions, each corresponding to at least one of M×N transmitter/receiver pairs. At least one of the transmitter/receiver pairs defines one of the corresponding virtual transceiver positions that spatially coincides with the corresponding virtual transceiver position defined by a second one of the transmitter/receiver pairs different from the first transmitter/receiver pair. The radar control circuitry is configured to (i) transmit simultaneously via each of the M radar transmitters M corresponding radar output signals, (ii) receive via the N radar receivers corresponding radar return signals arising from the M radar output signals, and (iii) generate from the radar return signals N corresponding electronic receiver signals.

One or more objects can backscatter or backreflect the radar return signals arising from the M radar output signals. M×N virtual transceiver signals can be generated from the N electronic receiver signals, with each virtual transceiver signal corresponding to one of the M×N virtual transceiver positions and arising from the corresponding transmitter/receiver pair. Estimated angular positions of the objects can be generated using the M×N virtual transceiver signals. Differences of one or more signal characteristics can be determined between two or more of the virtual transceiver signals, two or more of which (i) correspond to the same virtual transceiver position and (ii) arise from different corresponding radar transmitter/receiver pairs. If such differences exceed one or more corresponding predetermined thresholds or meet one or more corresponding predetermined criteria, then an estimated angular position generated using the corresponding virtual transceiver signals can be classified as a low-confidence estimated angular position. In some examples low-confidence estimated angular positions can be discarded; in some examples an indicator of a reduced relative weight can be generated for subsequent processing for each estimated angular position that is classified as a low-confidence estimated angular position. In some instances, such differences can result from radar signals propagating outside a selected field-of-view (FOV) of the MIMO radar apparatus, or multipath propagation of the radar signals.

Objects and advantages pertaining to MIMO radar systems may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
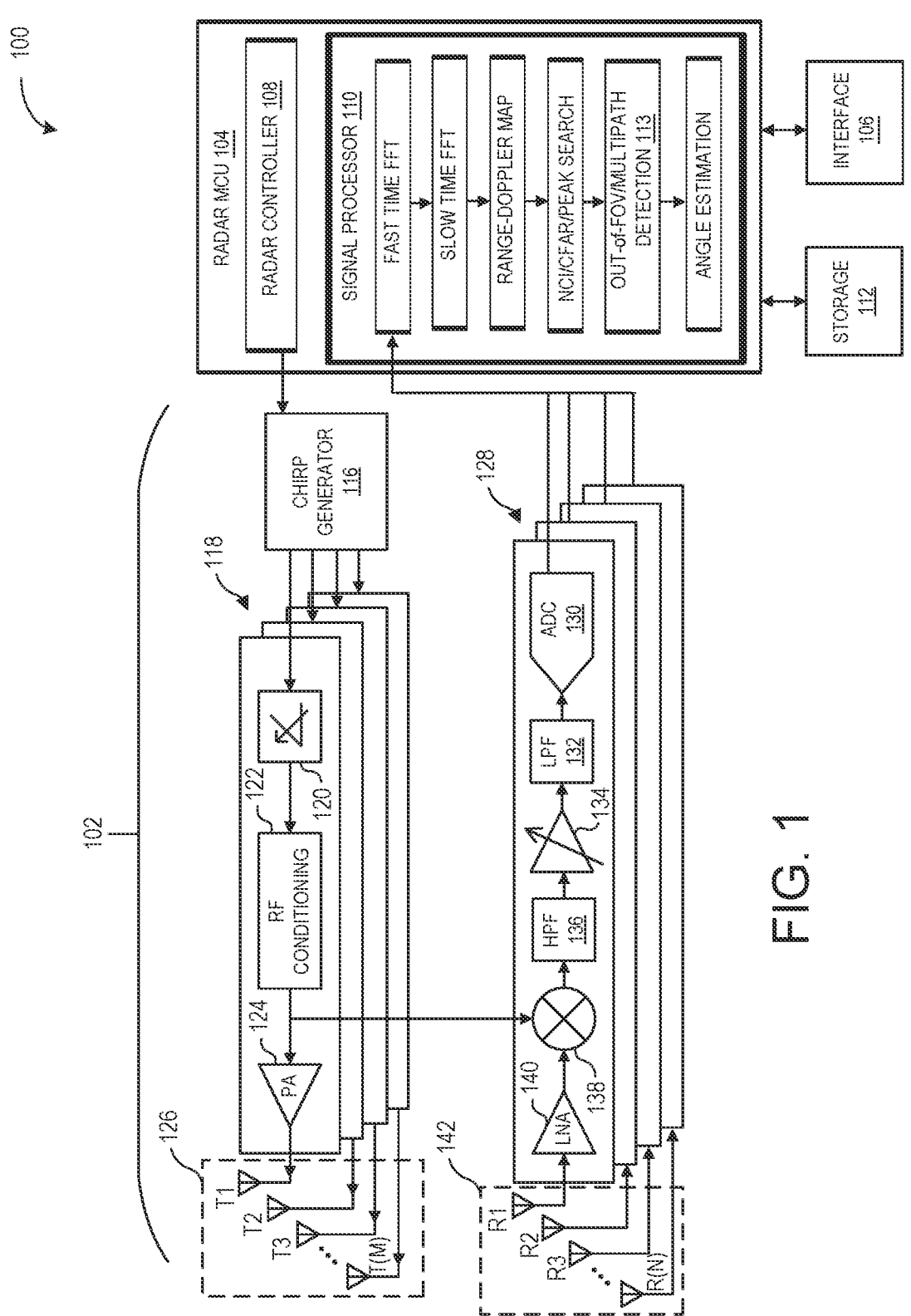
FIG. 1 illustrates schematically connections between radar transmitters, radar receivers, and radar control circuitry of an example MIMO radar system.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the disclosed subject matter. The detailed description illustrates by way of example, not by way of limitation, the principles of the disclosed subject matter.

As noted above, multiple-input multiple-output (MIMO) radar systems are commonly incorporated into self-driving automobiles and advanced driver assistant systems (ADAS). In a MIMO radar system, multiple radar transmitters illuminate an area with multiple radar output signals, and backscattered or backreflected radar return signals arising from those radar output signals are detected by multiple radar receivers. If the radar return signals arising from each of the radar transmitters and detected by each of the radar receivers can be distinguished from one another, then a MIMO radar system comprising M transmitters and N receivers can function as a virtual array of M×N virtual transceivers. Each virtual transceiver corresponds to a transmitter/receiver pair of only one of the M transmitters and only one of the N radar receivers. Typically, each virtual transceiver functions as if located at a corresponding virtual transceiver location that is midway along a line connecting the radar transmitter and radar receiver of the corresponding transmitter/receiver pair. Each virtual transceiver signal corresponds to one of the M×N virtual transceiver positions and arises from the corresponding transmitter/receiver pair (i.e., from a radar return signal arising from the radar transmitter output signal that is detected by the radar receiver). The angular position of an object that backscatters or backreflects radar return signals can be estimated based on the multiple virtual transceiver signals. Angular resolution can be enhanced by increasing the number of virtual transceivers, by spreading the positions of the virtual transceivers across larger distances (i.e., forming a larger device effective aperture), or both.

Various schemes can be employed so that radar return signals arising from different radar transmitters and detected by the same radar receiver can be distinguished from one another, so as to enable extraction of M distinct virtual transceiver signals from each of N electronic receiver signals. In a time division multiplexed (TDM) scheme, only one radar transmitter transmits its radar output signal at any given time. During that time, the N electronic receiver signals reflect a subset of N of the virtual transceiver signals. Cycling through a sequence of all M transmitters, with only one transmitter transmitting at any given time, yields the full set of M×N virtual transceiver signals.

Speed, throughput, and maximum detectable velocity of the MIMO radar system can be improved by operating all M radar transmitters simultaneously and extracting M distinct virtual transceiver signals (i.e., one for each of the simultaneously transmitting radar transmitters) from each of N electronic receiver signals (i.e., one from each radar receiver). In that way all M×N virtual transmitter signals can be produced concurrently. Various modulation schemes can be employed for enabling signals arising from different radar transmitters to be extracted from a single electronic receiver signal, e.g., code division multiplexed (CDM), frequency division multiplexed (FDM), or Doppler division multiplexed (DDM). Radar control circuitry operatively coupled to the radar transmitters and receivers can be structured, connected, programmed, or otherwise configured in any suitable way to extract from the N electronic receiver signals the M×N virtual transceiver signals.

Under certain conditions conventional MIMO radar systems can exhibit one or more deficiencies that can degrade the accuracy of estimation of an angular position of an object that backreflects or backscatters portions of the M radar output signals. For example, the accuracy of angular estimates produced by the MIMO radar system can become less reliable at wider viewing angles, i.e., for objects outside the MIMO radar system's nominal field-of-view (FOV).

In some instances, so-called multipath propagation can degrade the accuracy of angular estimates produced by the MIMO radar system. In radar operation, typically one is interested in direct-path signals, i.e., a radar return signal propagating in a straight line from a backscattering or backreflecting object to the radar receiver, arising from a radar output signal that propagated in a straight line from the radar transmitter to the object. In multipath propagation, the radar output signal or the radar return signal do not both propagate along straight lines; one or both are reflected or scattered from a secondary object or surface. In the example of automotive radar detection of another vehicle, the direct-path radar signals propagate in a straight line from the transmitter to the other vehicle, and back from the other vehicle to the receiver. In contrast, multipath propagation might include a radar output signal undergoing reflection or scattering from a guardrail or a third vehicle or the ground before reaching the other vehicle, or the radar return signal might similarly be reflected or scattered from the guardrail, third vehicle, or ground before reaching the radar receiver. In either case, multipath propagation results in the direction of departure (DoD) of the radar output signal differing from the direction of arrival (DoA); with direct-path propagation, the DoD and DoA are the same. When the DoD differs from the DoA, the accuracy of the resulting estimated angular position can be degraded or unreliable. For example, multipath propagation can result in spurious detection of a vehicle at a position where no vehicle is present.

Accordingly, it would be desirable to provide a MIMO radar apparatus wherein such degraded or unreliable (i.e., low-confidence) estimated angular positions could be discarded, or assigned a reduced relative weight for subsequent processing. Disclosed herein are various embodiments of a MIMO radar system in which the radar transmitters and receivers are arranged so that at least one virtual transceiver position, corresponding to a first transmitter/receiver pair, spatially coincides with the virtual transceiver position corresponding to a second transmitter/receiver pair different from the first pair. In other words, the two transmitter/receiver pairs share the same virtual transceiver position, despite the two transmitters being located at positions different from each other and the two receivers being located at positions different from each other. In some examples, when a backscattering object is out of the device FOV, larger, or more widely variable, differences in phase or power are observed between virtual transceiver signals that correspond to coincident virtual transceiver positions but arise from different transmitter/receiver pairs. In some examples, spatial spectra of signals arising from two virtual arrays can be compared, with the arrays including the same set of virtual transceiver positions, but at one or more of those positions the corresponding transceiver signals arise from different transmitter/receiver pairs. When one or more of the radar signals undergoes multipath propagation, those spectra can exhibit larger differences, or wider variation of differences, compared to spatial spectra of direct-path signals. Observation of sufficiently large differences can serve as a basis for identifying low-confidence estimated angular positions; estimated angular positions thus identified as low-confidence can then be discarded, or an indicator of a reduced relative weight for subsequent processing can be generated. Note that assigning a relative weight of zero to an estimated angular position is equivalent to skipping or disregarding that estimated angular position.

FIG. 1 illustrates schematically an example of a MIMO radar system 100 comprising a radar device 102 and a radar microcontroller unit (MCU) 104. The radar device 102 includes (i) a set 126 of radar transmitters T1, T2, . . . , T(i), . . . , T(M) each connected to a corresponding radio-frequency (RF) transmitter module 118, and (ii) a set 142 of radar receivers R1, R2, . . . , R(j), . . . , R(N) each connected to a corresponding RF receiver module 128. The transmitters T(i) and the receivers R(j) are arranged as described above, with at least two distinct transmitter/receiver pairs defining spatially coincident virtual transceiver positions. The radar MCU 104 comprises a radar controller 108 and a signal processor 110. A portion 113 of the radar MCU 104 is configured to identify low-confidence estimated angular positions as described above. The radar MCU 104 may be connected and configured to supply input control signals to the transmitter modules 118 (directly or via intervening components) and to receive digital output signals generated by the receiver modules 128. The signal processor 110 may be configured and arranged for signal processing tasks such as, but not limited to, object identification, computation of the estimated distance or range to an object, computation of the estimated radial velocity of the object, or computation of the DoA of signals backreflected or backscattered by the object, and so forth. The signal processor 110 can provide calculated values associated with such computations to a storage 112 and/or to other systems via an interface 106.

The interface 106 can enable the radar MCU 104 to communicate with other systems over local or wide area networks, the internet, automotive communication buses, or other suitable types of wired or wireless communication systems, as non-limiting examples. In some examples, the MCU 104 can provide the calculated values over the interface 106 to other systems, such as a radar-camera-lidar fusion system; an automated driving assistance system including parking, braking, or lane-change assistance features; and so forth. The storage 112 can be used to store instructions for the radar MCU 104, received data from the radar device 102, calculated values from the signal processor 110, and the like. Storage 112 can be any suitable storage medium, such as a volatile or non-volatile memory.

The specific example shown in FIG. 1 is arranged as a Doppler division multiplexed (DDM) system, so that the radar device 102 includes a chirp generator 116; other arrangements (e.g., frequency division multiplexed (FDM) or code division multiplexed (CDM)) can be employed for the MIMO radar system 100 wherein the radar device 102 would not necessarily include the chirp generator 116, and could include other suitable components (e.g., one or more RF oscillators or code generators). The radar MCU 104 comprises a radar controller 108 and a signal processor 110, including the portion 113 configured to identify low-confidence estimated angular positions. Any one or more of the radar device 102, subparts or functional subunits thereof, or the radar MCU 104, or subparts of functional subunits thereof, can each be implemented as a single integrated circuit (chip), as multiple connected chips, as other hardware or software or firmware, or as various suitable combinations thereof. In some examples the radar device 102 can be embodied as a line-replaceable unit (LRU) or modular component that is designed to be replaced quickly at an operating location; in some examples the radar MCU 104 can be embodied as a line-replaceable unit (LRU) or modular component that is designed to be replaced quickly at an operating location.

The M radar transmitters T(i) (also referred to as transmitters or transmit antennas or transmitting antenna elements) can be of any suitable type or arrangement. In the examples shown, each RF transmit module 118 can include a phase shifter or phase rotator 120, an RF conditioning module 122 for filtering RF signals, and a power amplifier 124. In response to a signal from the radar MCU 104 (or, if present, the chirp generator 116, an RF oscillator, or a code generator), a corresponding phase-shifted, filtered, and amplified RF signal is delivered to the corresponding radar transmitter T(i), which in turn produces the corresponding radar output signal. In some examples the radar device 102 can include a digital-to-analog converter (DAC) coupling the radar controller 108 to the RF transmitter modules 118. The radar device 102 is arranged so that the M radar transmitters T(i) transmit simultaneously the M corresponding radar output signals, which should exhibit sufficient coherence with one another, or sufficiently small frequency offsets from one another, to be suitable for, e.g., DDM, FDM, or CDM operation, and to enable the signal processing operations described hereinafter.

The N radar receivers R(j) (also referred to as receivers or receive antennas or receiving antenna elements) can be of any suitable type or arrangement. In the examples shown, each RF receive module 128 can include a low-noise amplifier (LNA) 140, a mixer 138, a high-pass filter (HPF) 136, a variable gain amplifier (VGA) 134, a low-pass filter (LPF) 132, and an analog-to-digital converter (ADC) 130. Each of the N radar receivers R(j) receives radar return signals, which can include portions of the M radar output signals backreflected or backscattered by an object, and delivers those signals to the corresponding RF receive module 128. In this example the mixer 138 receives RF signals from the RF transmit modules 118 to facilitate demodulation of the M radar return signals. The amplified, filtered, demodulated, and A/D-converted signals from the RF receive modules 128 are delivered to the signal processor 110 of the radar MCU 104.

The radar controller 108 of the radar MCU 104 can be of any suitable type or arrangement. Similarly, the signal processor 110 of the radar MCU 104 can be of any suitable type or arrangement. In the example shown, the signal processor includes submodules or subcomponents for (i) a fast time fast Fourier transform (FFT), (ii) a slow time FFT, (iii) a range-Doppler map, (iv) NCI/CFAR/peak search, (v) out-of-field-of view (out-of-FOV) or multipath detection 113 (configured for the identification of low-confidence estimated angular positions as described herein), and (vi) angle estimation. In some examples the radar MCU 104 can be operatively coupled to a storage unit 112 or an interface unit 106.

The internal arrangements of each of the RF transmitter modules 118 and RF receiver modules 128 that are shown and described above are only examples; any suitable internal arrangements of the RF transmitter modules 118 or the RF receiver modules 128 can be employed. Likewise, the specific internal arrangement of the radar MCU 104 shown in FIG. 1 is only an example; any suitable internal arrangement of the radar MCU 104 can be employed. Note that the term "radar control circuitry" as employed herein shall denote collectively the radar MCU 104 and all of its constituent parts, the RF transmitter modules 118 and all of their constituent parts, the RF receiver modules 128 and all of their constituent parts, as well as any additional components of the radar device 102 (e.g., the chirp generator 116, one or more RF oscillators or code generators, and so forth).

As used herein the terms "circuit," "circuitry,", "processor," "controller" or "microcontroller," "MCU," "modules," and related terminology mean any suitable combination(s) of analog or digital circuit elements, hardware, firmware, software, and the like, including but not limited to, application-specific integrated circuits (ASICs), field programmable gate arrays (FPGAs), microcontrollers, and microprocessors. It will be understood that those terms encompass nonvolatile and volatile memory devices, including but not limited to random access memory (RAM), read-only memory (ROM), and the like, which can be implemented using any suitable devices, such as SRAM, DRAM, or magnetic storage devices as non-limiting examples. Along these lines it will be understood that references to those terms can include devices in which general purpose computing devices includes or is otherwise coupled to memory which stores machine-readable instructions configured to cause the described actions to be performed. Such instructions can be stored as instructions in a high-level programming language that are interpreted or compiled into object code or machine language, or they can be stored directly as object code or another suitable representation, as nonlimiting examples.

Figure 2A:
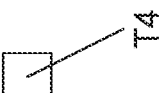
FIGS. 2A and 2B illustrate schematically arrays of radar transmitters and receivers, respectively, of an example of a conventional MIMO radar system.
Figure 2B:
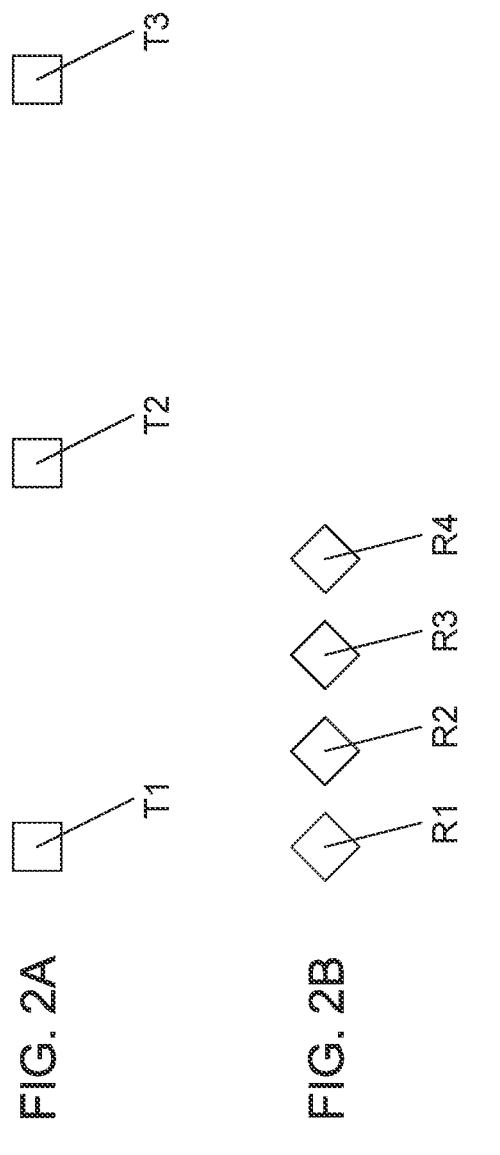
Figure 2C:
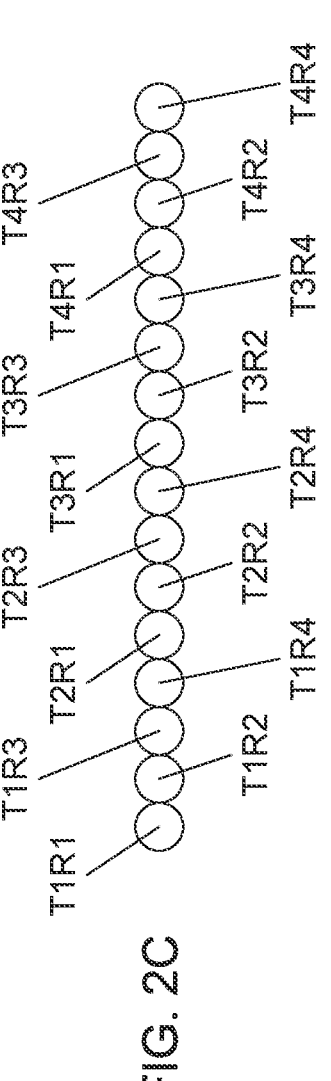
FIG. 2C illustrates schematically an array of corresponding virtual transceiver positions, all of which are distinct from one another.
Figure 2D:
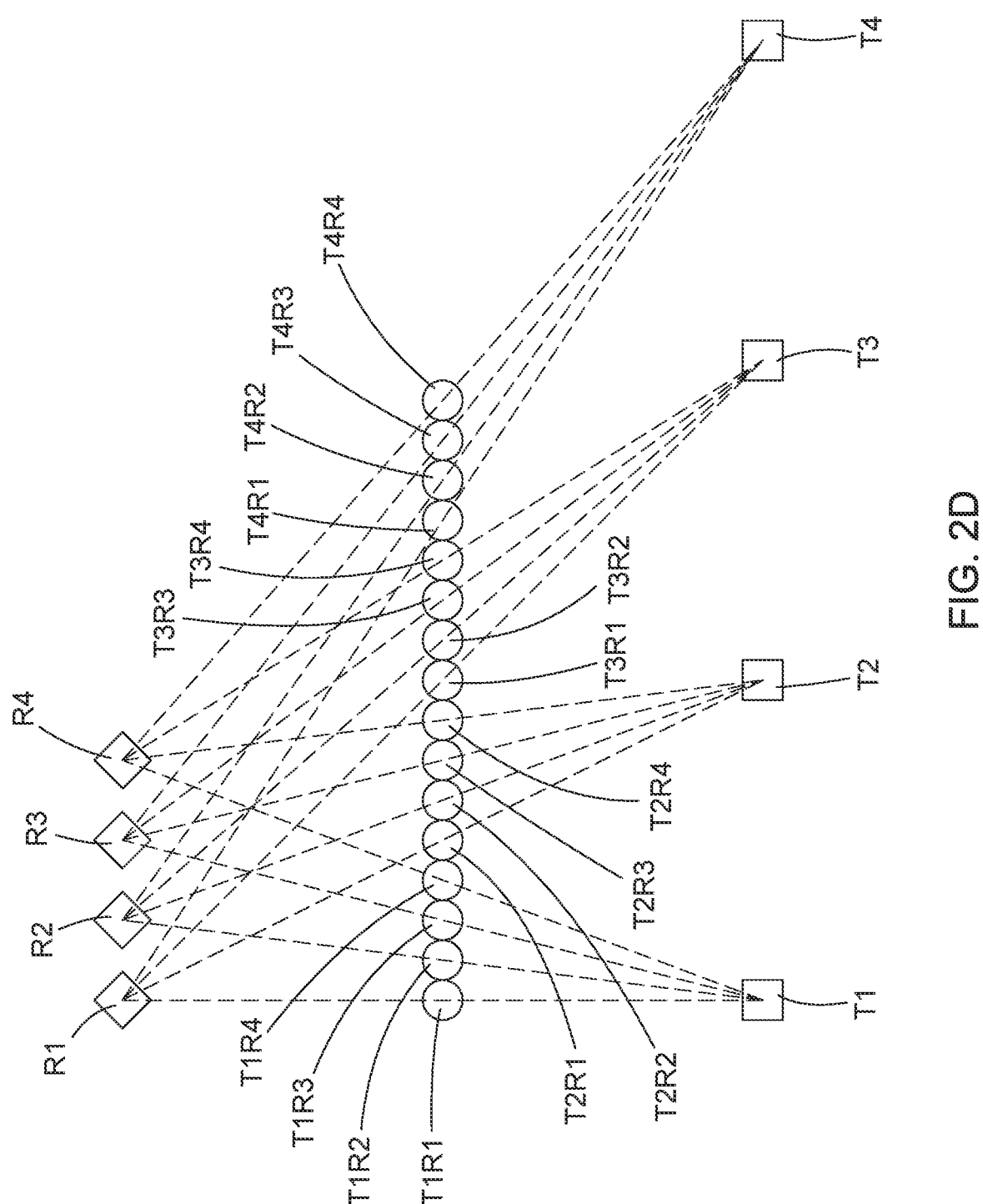
FIG. 2D illustrates schematically the relative arrangement of the arrays of FIGS. 2A-2C.

One example of a conventional arrangement of a set of M=4 radar transmitters T1/T2/T3/T4 and N=4 radar receivers R1/R2/R3/R4 is illustrated schematically in FIGS. 2A-2D. FIGS. 2A and 2B illustrate schematically arrangements of the four transmitters and the four receivers, respectively, and FIG. 2C illustrates schematically the resulting array of the virtual transceiver positions of M×N=16 virtual transceivers T1R1, T1R2, . . . , T(M)R(N). FIG. 2D illustrates schematically the relative positions of the arrays of FIGS. 2A-2C. In this example the virtual transceiver positions are all distinct from one another and form a so-called uniform linear array (ULA); more generally, the radar transmitters and receivers can be arranged to define an array of virtual transceiver positions of any desired spatial arrangement, e.g., a linear array (uniform or non-uniform), a two-dimensional array (uniform or non-uniform), and so forth. Angular resolution of a MIMO system depends on, inter alia, the number and arrangement of the virtual transceiver positions. Estimates of angular positions of objects are derived from the M×N virtual transceiver signals, which are extracted from the electronic receiver signals produced by the N radar receivers in response to receiving radar return signals arising from the radar output signals produced by the M radar transmitters. Any suitable computation or analysis methods can be applied to the M×N virtual transceiver signals to estimate angular positions, e.g., using the signal processor 110.

Figure 3A:
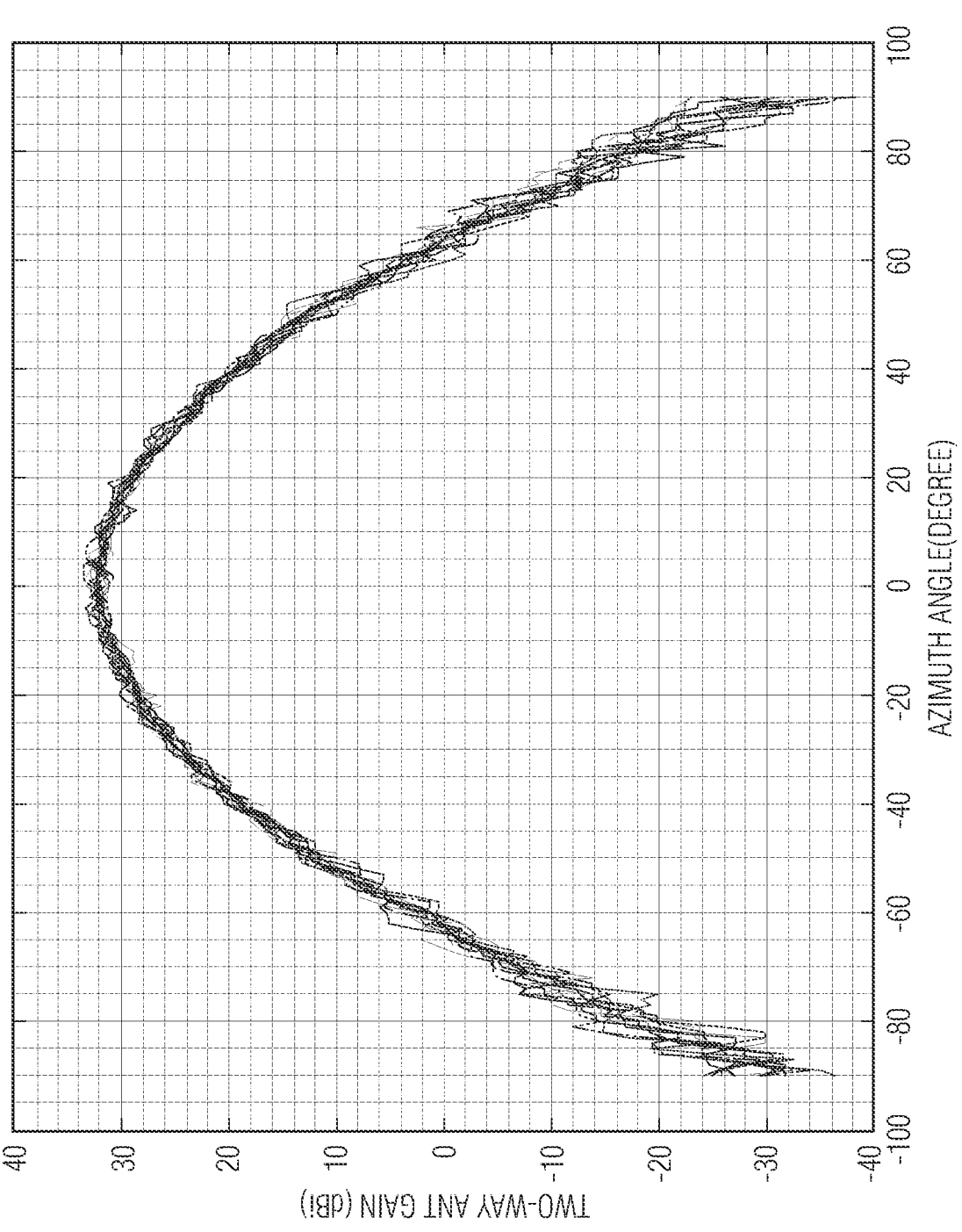
FIGS. 3A, 3B, and 3C are plots of antenna gain, steering vector calibration performance, and angle estimation error, respectively, as a function of azimuth angle.
Figure 3B:
Figure 3C:
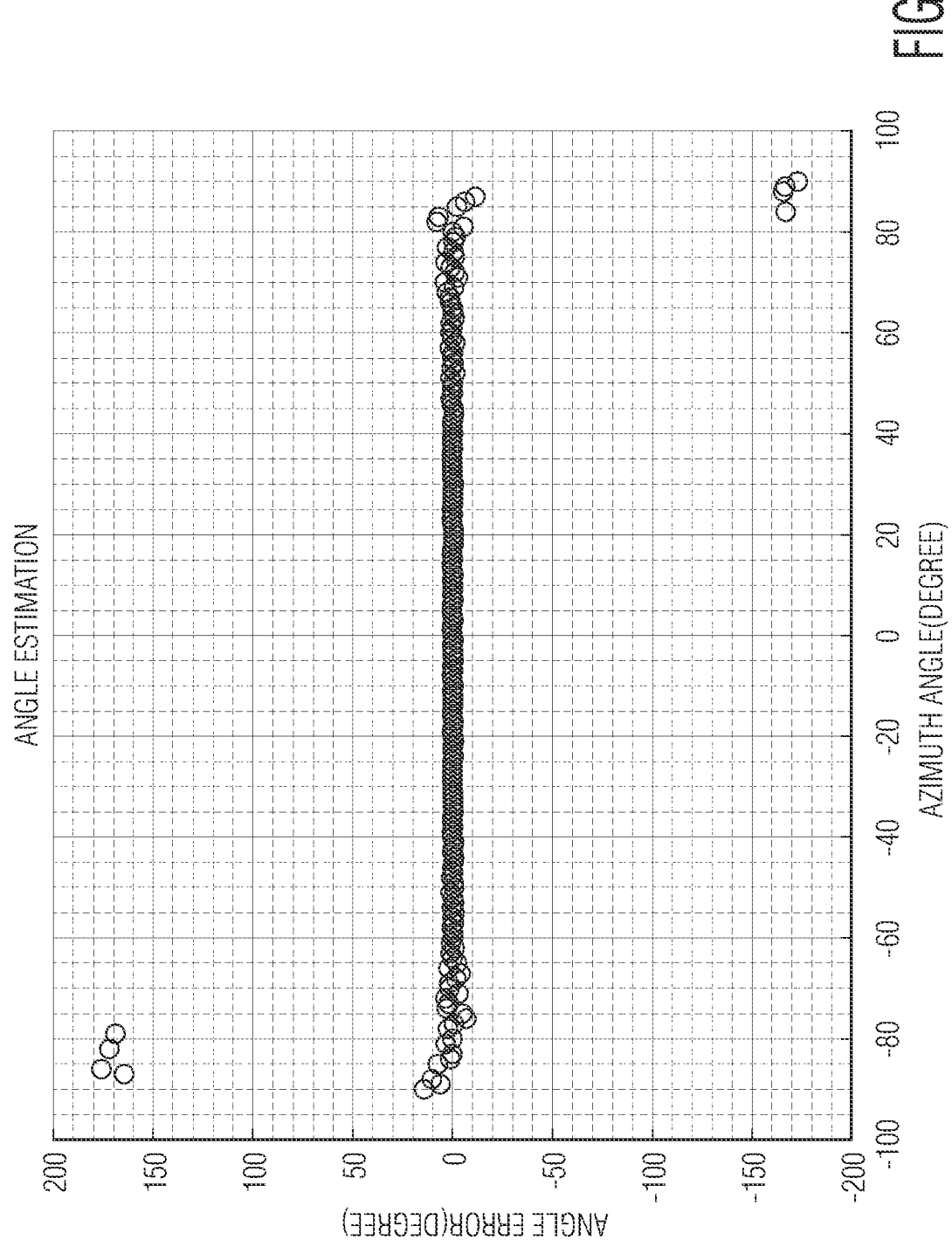

FIG. 3A shows plots of gain of an array of radar antennas as a function of azimuth angle measured in a chamber, showing decreasing gain and increasing noise with increasing azimuth angle. FIG. 3B shows a plot of the correlation between measured and ideal steering vectors (i.e., estimated angular positions) as a function of azimuth angle, clearly showing decreasing correlation and increasing noise with increasing azimuth angle. FIG. 3C is a plot of angle estimation errors as a function of azimuth angle, and clearly shows that such estimates are increasingly unreliable outside a given field-of-view (FOV) of the MIMO radar apparatus (e.g., outside a FOV of ±50° in this example). At large azimuthal angles, estimated angular positions can become unreliable (i.e., inaccurate and/or noisy), e.g., due to the influence of multipath signals arriving at the receivers from directions that are outside the designed FOV of the antenna array.

Figures 4A, 4B, 4C:
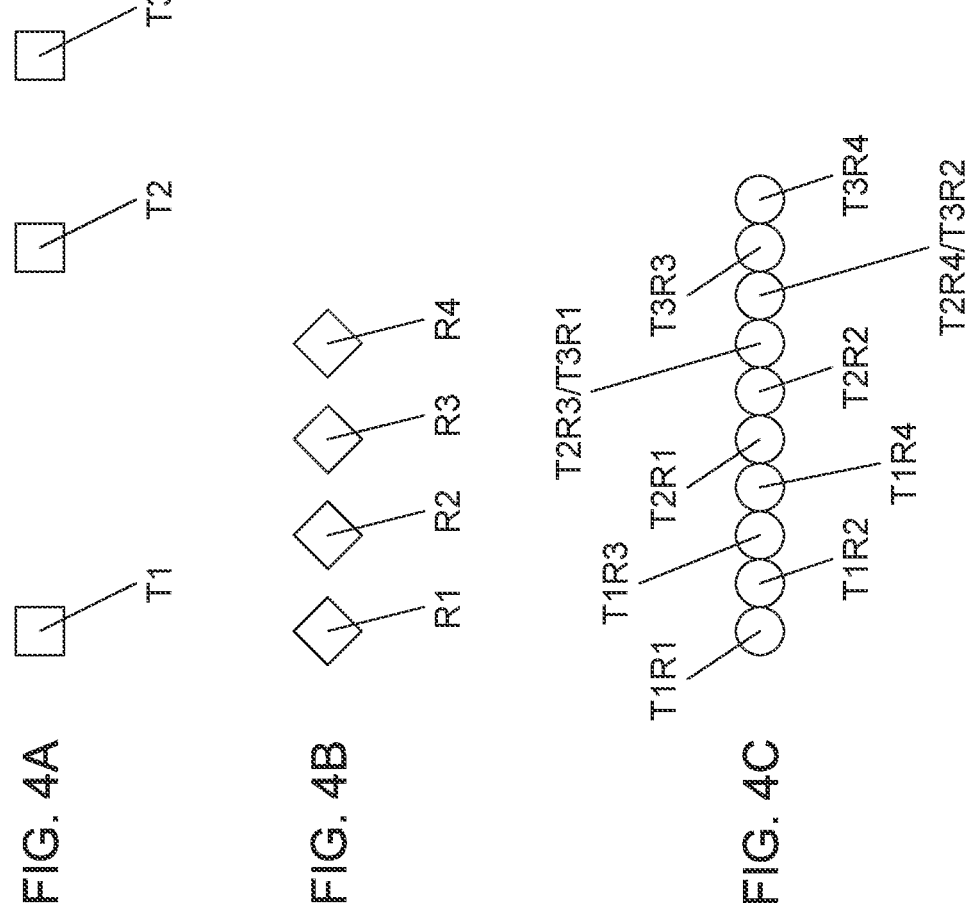
FIGS. 4A and 4B illustrate schematically arrays of radar transmitters and receivers, respectively, of a first example embodiment of a disclosed MIMO radar system.
FIG. 4C illustrates schematically an array of corresponding virtual transceiver positions, some of which are spatially coincident with each other.
Figure 4D:
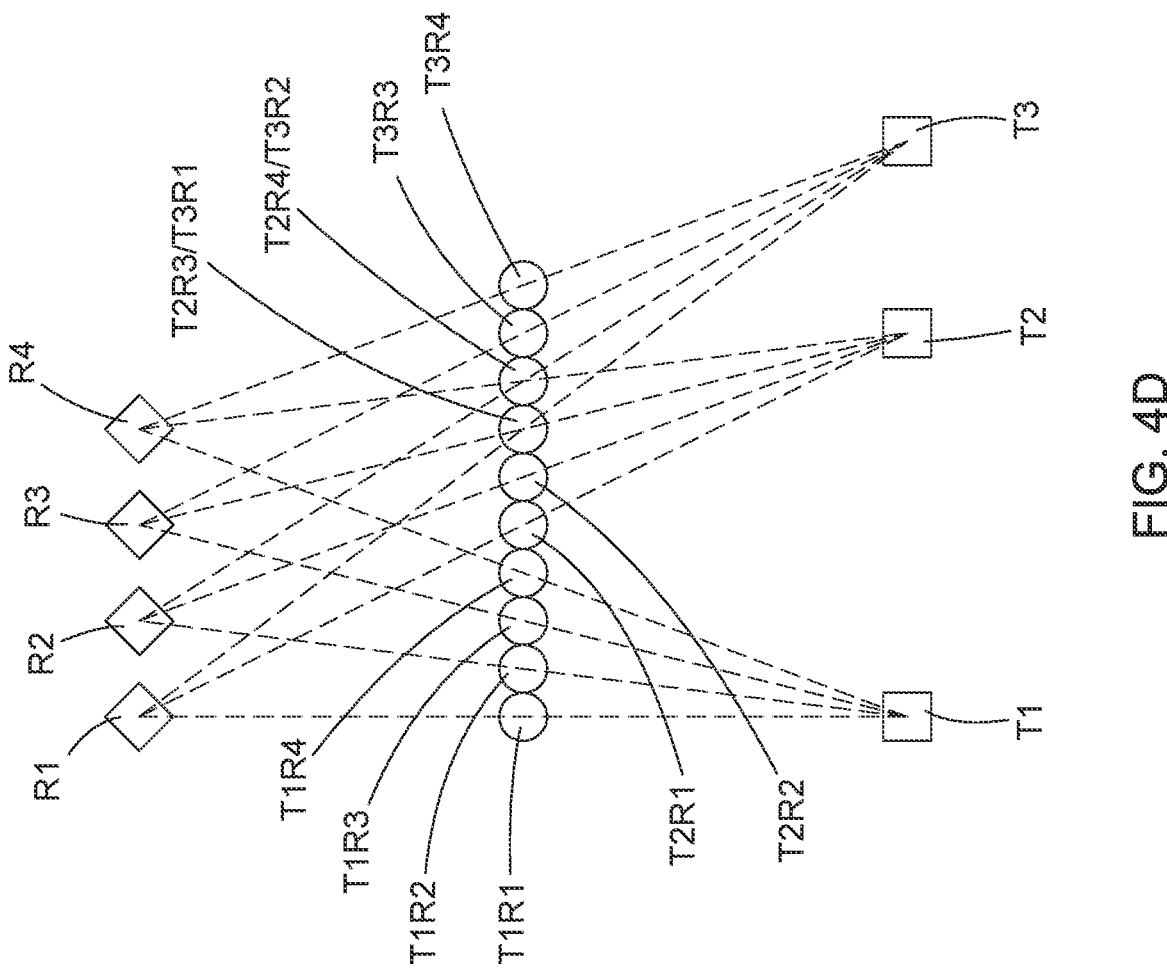
FIG. 4D illustrates schematically the relative arrangement of the arrays of FIGS. 4A-4C.
Figure 5A:
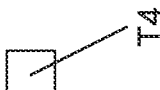
FIGS. 5A and 5B illustrate schematically arrays of radar transmitters and receivers, respectively, of a second example embodiment of a disclosed MIMO radar system.
Figure 5B:
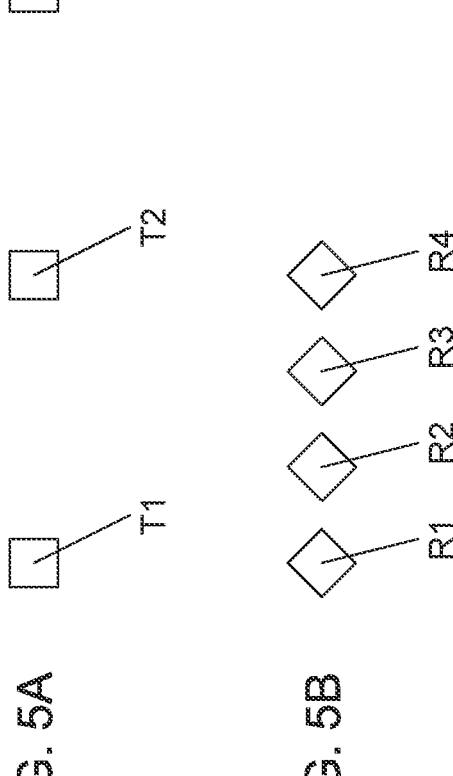
Figure 5C:
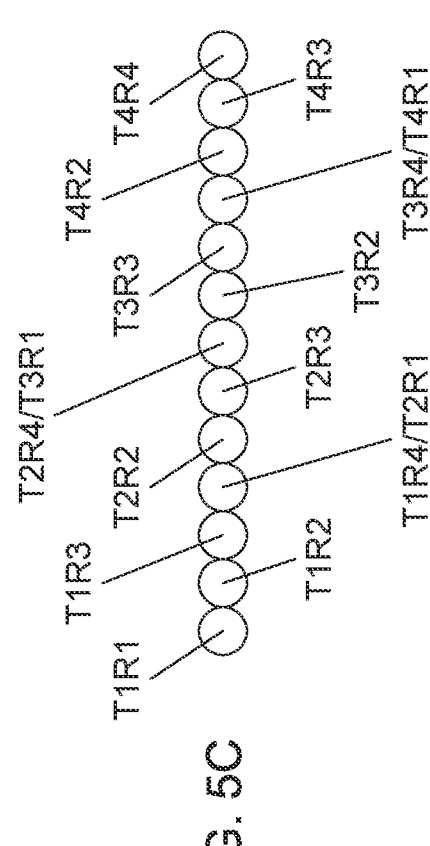
FIG. 5C illustrates schematically an array of corresponding virtual transceiver positions, some of which are spatially coincident with each other.
Figure 5D:
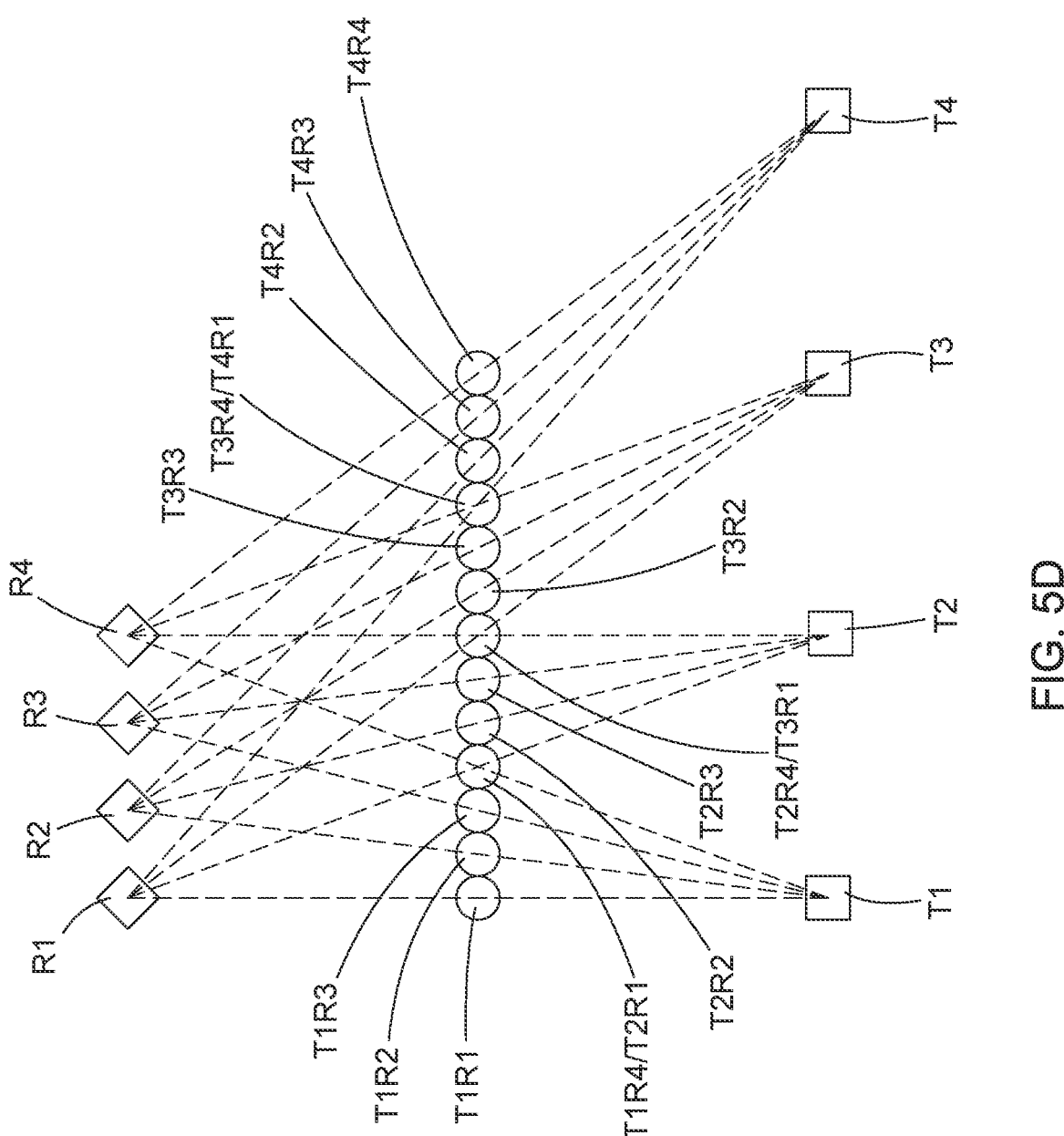
FIG. 5D illustrates schematically the relative arrangement of the arrays of FIGS. 5A-5C.

Disclosed embodiments include an arrangement of M simultaneously transmitting radar transmitters and N radar receivers of a MIMO radar apparatus that define a set of M×N virtual transceiver positions in which one or more of those virtual transceiver positions spatially coincides with at least one other of the virtual transceiver positions. A first example of such an arrangement of radar transmitters and receivers is illustrated schematically in FIGS. 4A-4D; a second example of such an arrangement of radar transmitters and receivers is illustrated schematically in FIGS. 5A-5D. FIGS. 4A and 4B show arrays of three radar transmitters T1, T2, and T3 (M=3) and four radar receivers R1, R2, R3, and R4 (N=4), respectively; FIG. 4C shows the resulting array of twelve (M×N) virtual transceivers but only ten distinct virtual transceiver positions; in that example the virtual transceiver positions T2R3 and T3R1 spatially coincide, and the virtual transceiver positions T2R4 and T3R2 spatially coincide. The relative positions of the arrays of FIGS. 4A-4C are shown in FIG. 4D. FIGS. 5A and 5B show arrays of four radar transmitters T1, T2, T3, and T4 (M=4) and four radar receivers R1, R2, R3, and R4 (N=4), respectively; FIG. 5C shows the resulting array of sixteen (M×N) virtual transceivers but only thirteen distinct virtual transceiver positions; in that example the virtual transceiver positions T1R4 and T2R1 spatially coincide, the virtual transceiver positions T2R4 and T3R1 spatially coincide, and the virtual transceiver positions T3R4 and T4R1 spatially coincide. The relative positions of the arrays of FIGS. 5A-5C are shown in FIG. 5D. In both of the examples shown the virtual transceiver positions are in a linear arrangement. More generally the radar transmitters and receivers can be arranged to define an array of virtual transceiver positions of any desired spatial arrangement (e.g., a linear array, a two-dimensional array, and so forth) that includes at least one virtual transceiver position that corresponds to two different transmitter/receiver pairs.

Figures 6A, 6B:
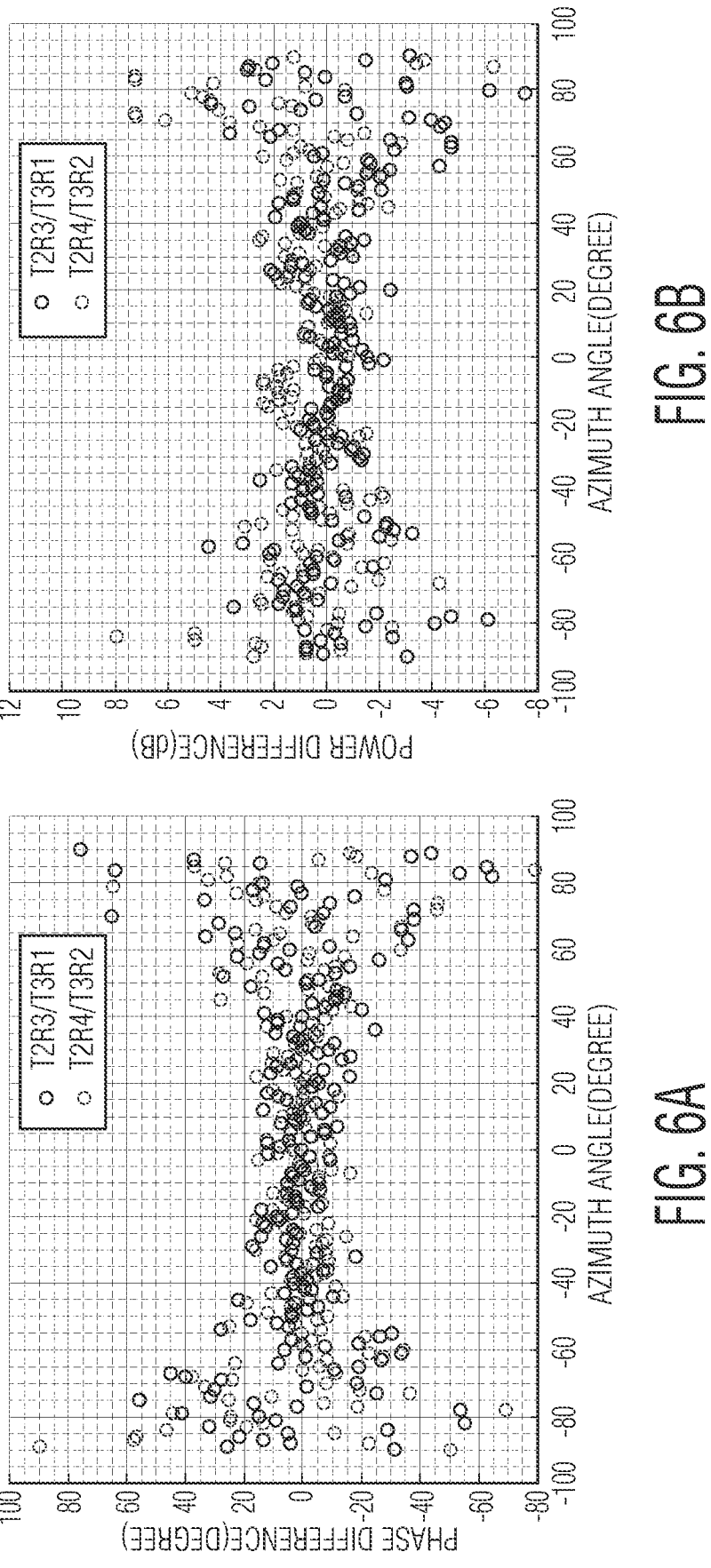
FIGS. 6A and 6B are plots of phase difference and power difference, respectively, as a function of azimuth angle for two pairs of spatially coinciding virtual transceivers.

FIGS. 6A and 6B are plots of phase and power differences, respectively, between virtual transceiver signals as a function of azimuth angle. The virtual transceiver signals arise from the arrangement of FIGS. 4A-4D, and (i) correspond to the same virtual transceiver position and (ii) arise from different corresponding radar transmitter/receiver pairs. One set of points represent phase and power differences between the virtual transceivers T2R3 and T3R1 (which spatially coincide); the other set of points represent phase and power differences between virtual transceivers T2R4 and T3R2, which spatially coincide. It can be readily appreciated from the plots of FIGS. 6A and 6B that those phase and power differences remain within a relatively narrow band within the MIMO radar apparatus FOV (e.g., ±50° in this example), but diverge widely at large viewing angles (i.e., out-of-FOV). An estimated angular position can be classified as low-confidence if it includes or would include two different virtual transceiver signals, with the same virtual transceiver position, between which phase or power differences exceeds a predetermined threshold. Such a low-confidence estimated angular position can be discarded, or reduced in relative weight for further processing (e.g., at block 113 of the signal processor 110 of FIG. 1).

Figure 7A:
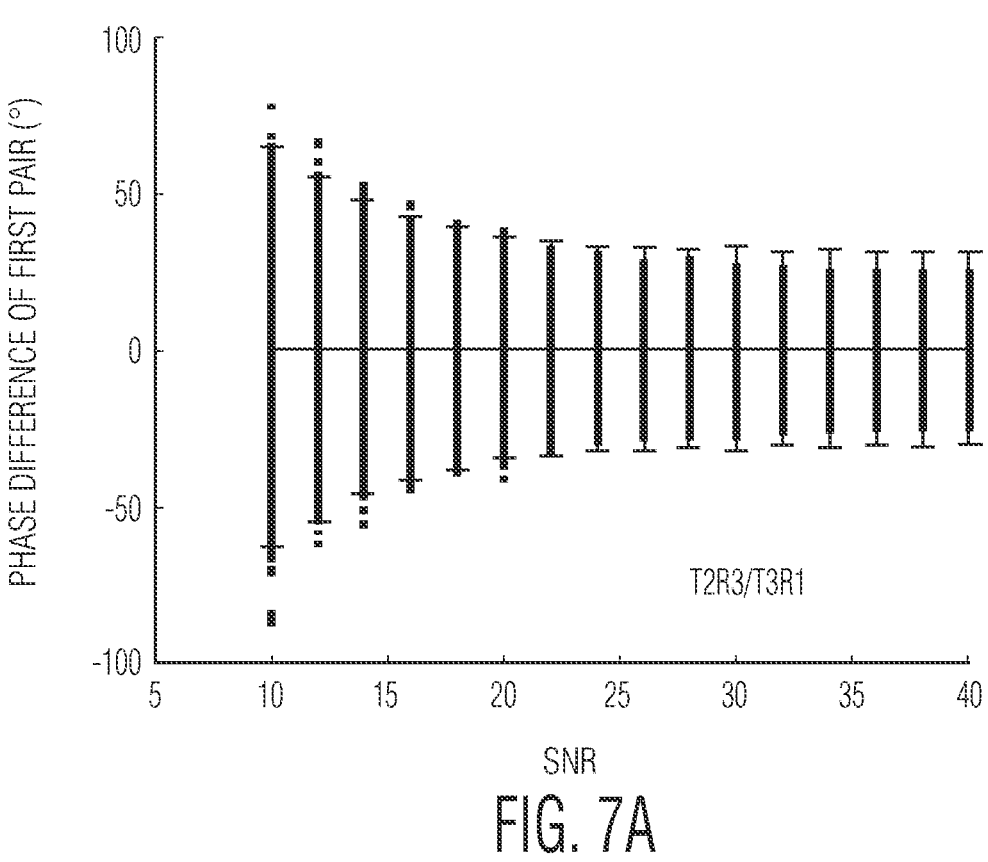
FIGS. 7A-7D are plots of $3\sigma$ distributions of phase or power differences, for two pairs of spatially coinciding virtual transceivers within a field-of-view (FOV) of $\pm 50°$, as a function of signal-to-noise ratio (SNR).
Figure 7B:
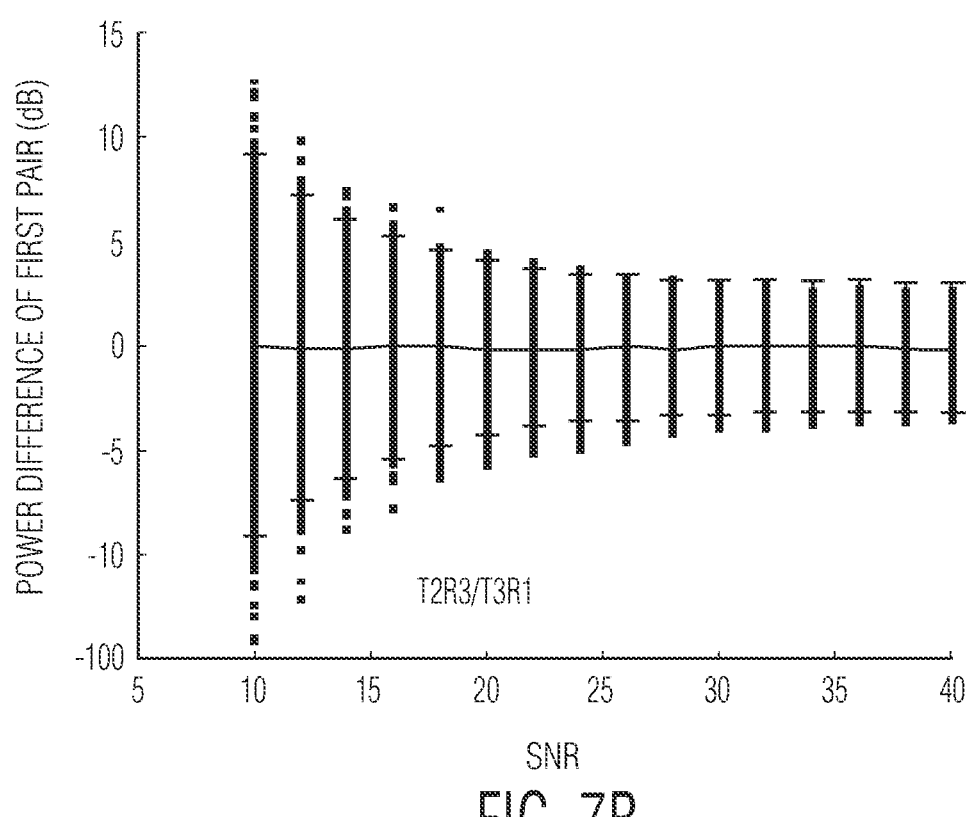
Figure 7C:
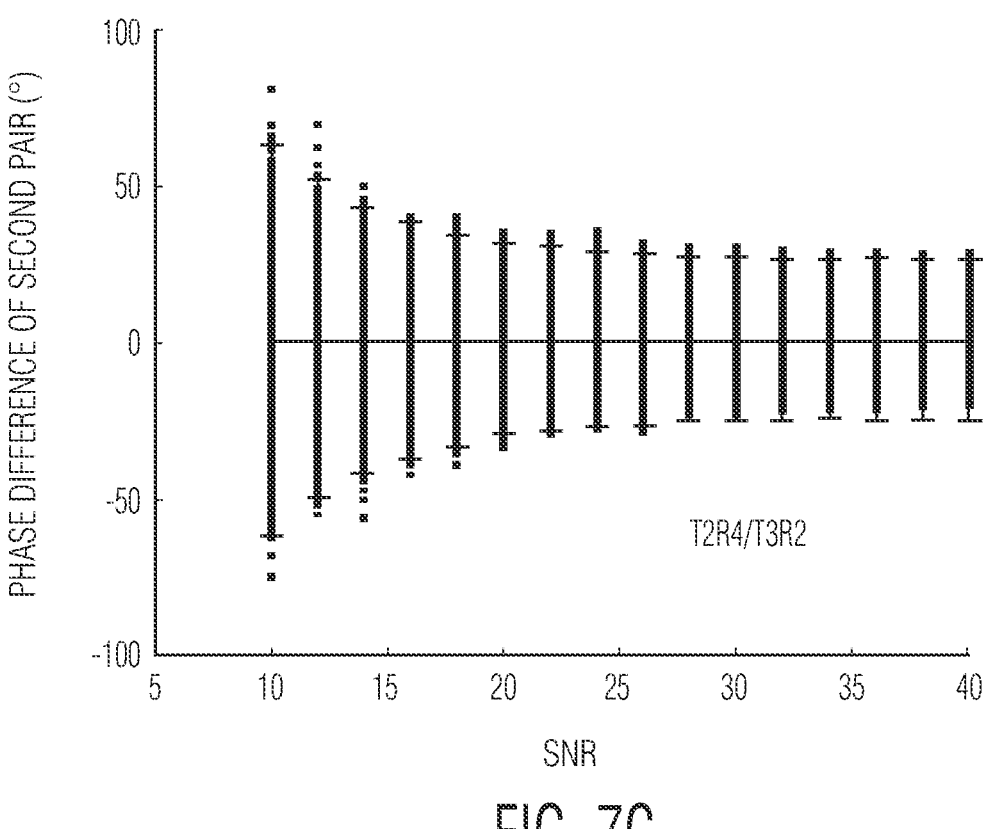
Figure 7D:
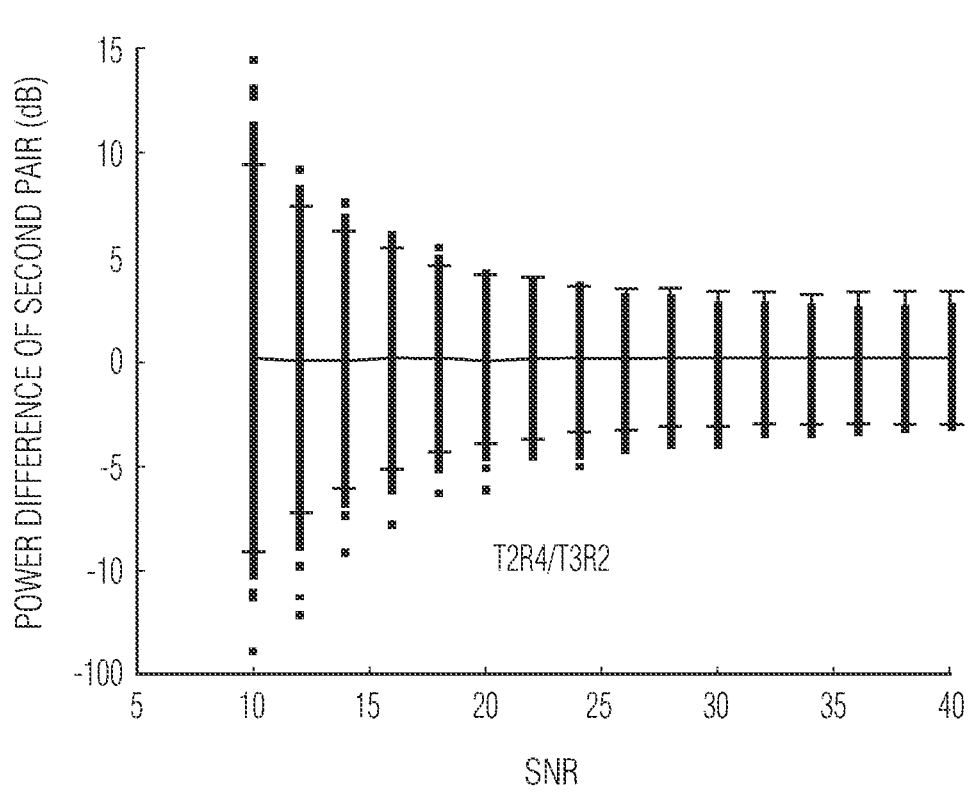
Figure 8:
FIG. 8 is a duplicate of the plot of FIG. 3C with each measurement indicated as high- or low-confidence based on a $3\sigma$ threshold.

Such a predetermined threshold can be selected in any suitable way. Real or simulated radar output signals can illuminate one or more real or simulated test objects, and phase or power difference measured between corresponding real or simulated virtual transceiver signals. In some examples, a standard deviation σ can be measured or simulated, and the predetermined threshold can be a selected fixed multiple of σ, e.g., 3σ. FIGS. 7A and 7B are plots, as a function of signal-to-noise ratio (SNR), of 3σ distributions of phase or power differences, respectively, between the virtual transceiver signals T2R3 and T3R1 within a field-of-view (FOV) of ±50°. FIGS. 7C and 7D are similar plots for the virtual transceiver signals T2R4 and T3R2. Once measured or simulated, the standard deviations σ, or a selected fixed multiple thereof (e.g., 3σ), can be used as the predetermined threshold for classifying the estimated angular position as low-confidence and discarding it, or assigning it a reduced relative weight. FIG. 8 is a plot of the same data as FIG. 3C with certain estimated angular positions designated as low-confidence based on the 3σ threshold.

Phase or power differences between different virtual transceiver signals corresponding to the same virtual transceiver position can also, or instead, be indicative of radar signals that produce those signals undergoing so-called multipath propagation. Typically in radar detection, one is interested in direct-path signals, i.e., a radar return signal propagating in a straight line from a backscattering or backreflecting object to the radar receiver, arising from a radar output signal that propagated in a straight line from the radar transmitter to the object. In multipath propagation, the radar output signal or the radar return signal do not both propagate along straight lines; one or both are reflected or scattered from a secondary object or surface. In the example of automotive radar detection of another vehicle, the direct-path radar signals propagate in a straight line from the transmitter to the other vehicle, and back from the other vehicle to the receiver. Multipath propagation might include a radar output signal undergoing reflection or scattering from a guardrail or a third vehicle or the ground before reaching the other vehicle, or the radar return signal might similarly be reflected or scattered from the guardrail, third vehicle, or ground before reaching the radar receiver. In either case, multipath propagation results in the direction of departure (DoD) of the radar output signal differing from the direction of arrival (DoA). With direct-path propagation, the DoD and DoA are the same.

Figures 9A, 9B:
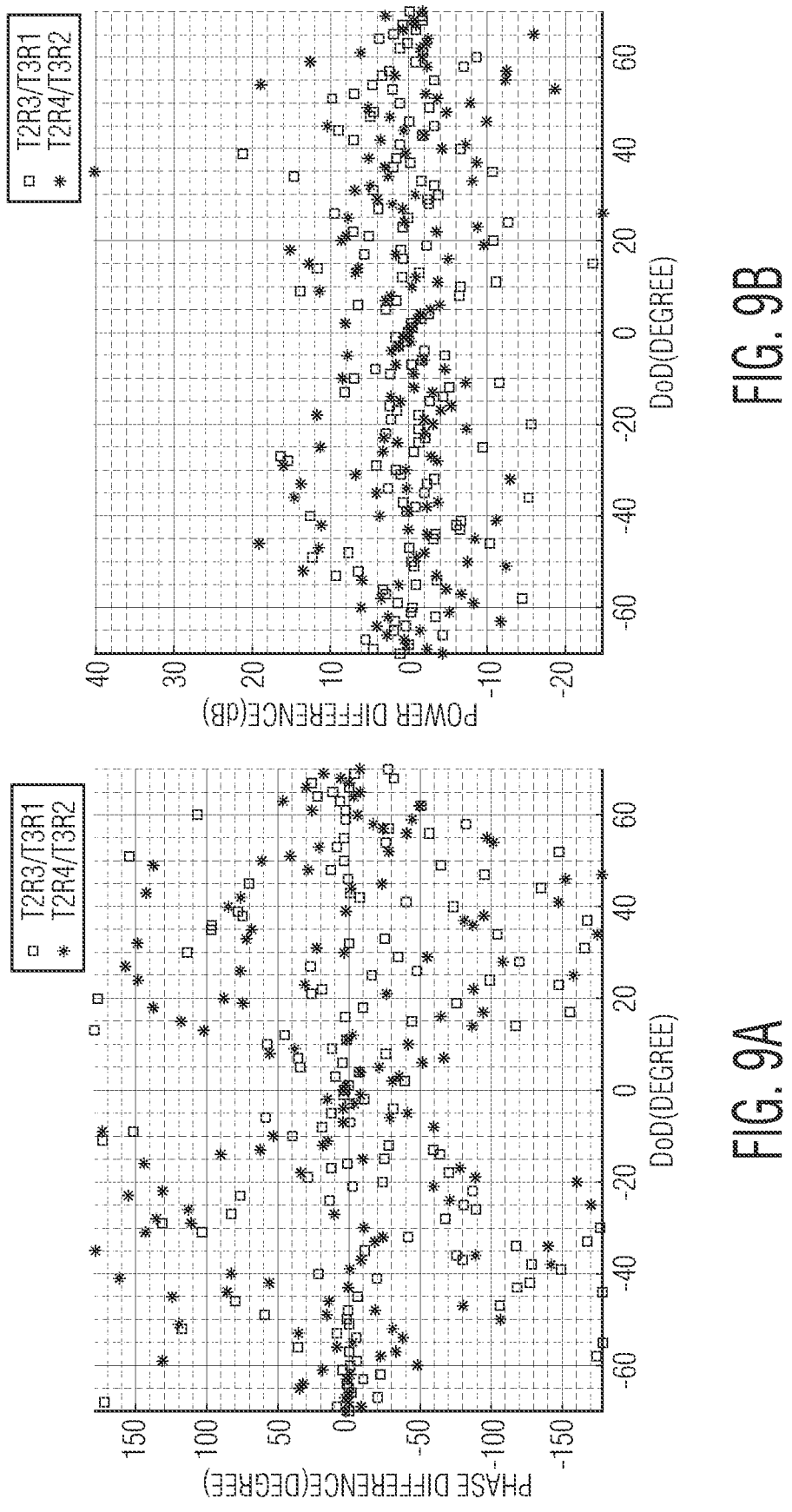
FIGS. 9A and 9B are plots of phase difference and power difference, respectively, as a function of azimuth angle for two pairs of spatially coinciding virtual transceivers.

FIGS. 9A and 9B are plots of phase and power differences between virtual transceiver signals, respectively, for a fixed DoA of 0°, as a function of DoD. The virtual signals arise from the arrangement of FIGS. 4A-4D, as described above. It can be readily appreciated from the plots of FIGS. 9A and 9B that those phase and power differences are relatively small when DoD=DoA, but grow larger with increasing difference between DoD and DoA. As with an out-of-FOV signal described above, an estimated angular position can be deemed low-confidence if it includes or would include two different virtual transceiver signals, with the same virtual transceiver position, between which phase or power differences exceeds a predetermined threshold (e.g., a or a fixed multiple thereof, such as 3σ). Such a low-confidence estimated angular position can be discarded, or reduced in relative weight for further processing (e.g., at block 113 of the signal processor 110 of FIG. 1).

Figures 10A, 10B:
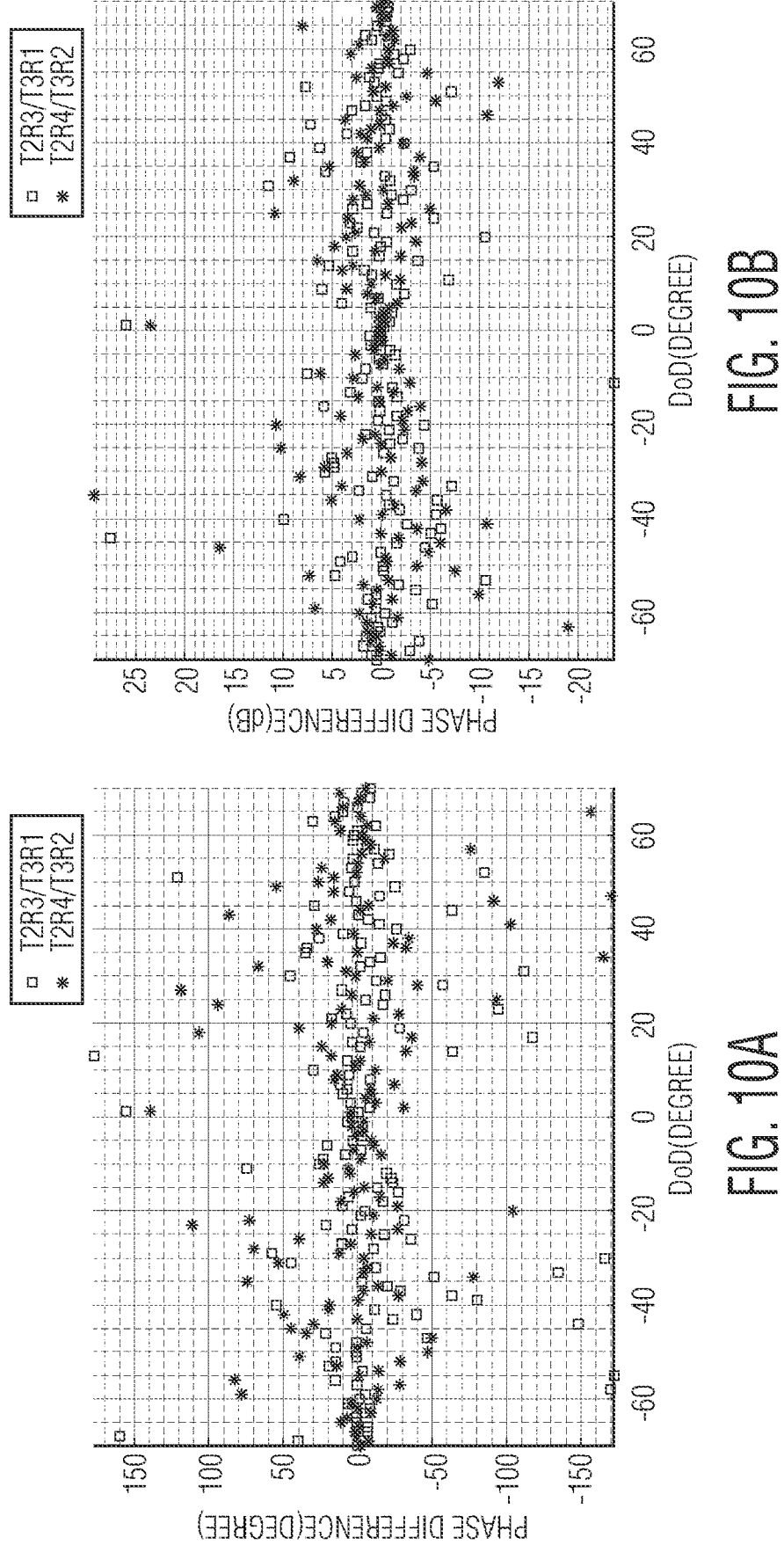
FIGS. 10A and 10B are plots of phase difference and power difference, respectively, as a function of azimuth angle for two pairs of spatially coinciding virtual transceivers.

The phase and power differences of FIGS. 9A and 9B result from so-called "strong multipath" signals, i.e., multipath signals that are comparable in strength to the direct-path signals. FIGS. 10A and 10B are similar plots of phase and power differences (arising from the arrangement of FIGS. 4A-4D) resulting from so-called "weak multipath" signals, i.e., multipath signals that are significantly weaker than the direct-path signals. In either case, a predetermined threshold for phase or power differences can be employed for classifying as low-confidence an estimated angular position that includes virtual transceiver signals for which the threshold is exceeded.

Figures 11A, 11B, 11C:
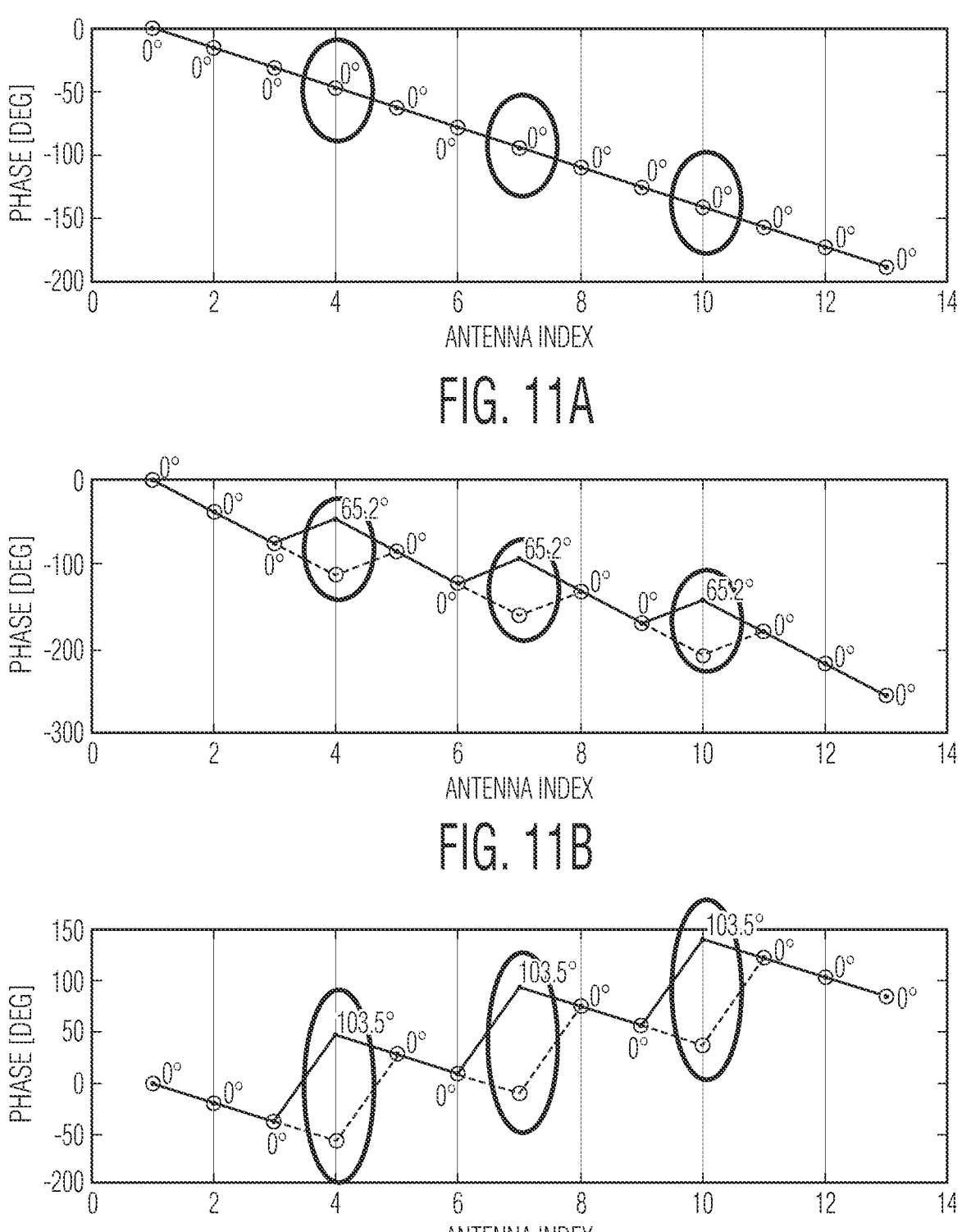
FIGS. 11A, 11B, and 11C are plots of phase as a function of virtual transceiver position for differing combinations of DoD and DoA.

Still another example is illustrated in the plots of FIGS. 11A-11C of virtual transceiver signal phase for the virtual transceiver arrangement of FIGS. 5A-5D, which includes three pairs of virtual transceivers that spatially coincide, i.e., T1R4/T2R1, T2R4/T3R1, and T3R4/T4R1. FIG. 11A (DoD=DoA=−5°) shows negligible phase differences between virtual transceiver signals of any of those pairs of virtual transceivers. FIG. 11B (DoD=−5°; DoA=−12°) shows significant phase mismatch between the virtual transceiver signals of those pairs, and FIG. 11C (DoD=5°; DoA=−6°) shows even larger phase differences. An appropriately selected threshold for phase or power differences can enable at least some signals arising from multipath radar propagation to be classified as low-confidence.

Figure 12:
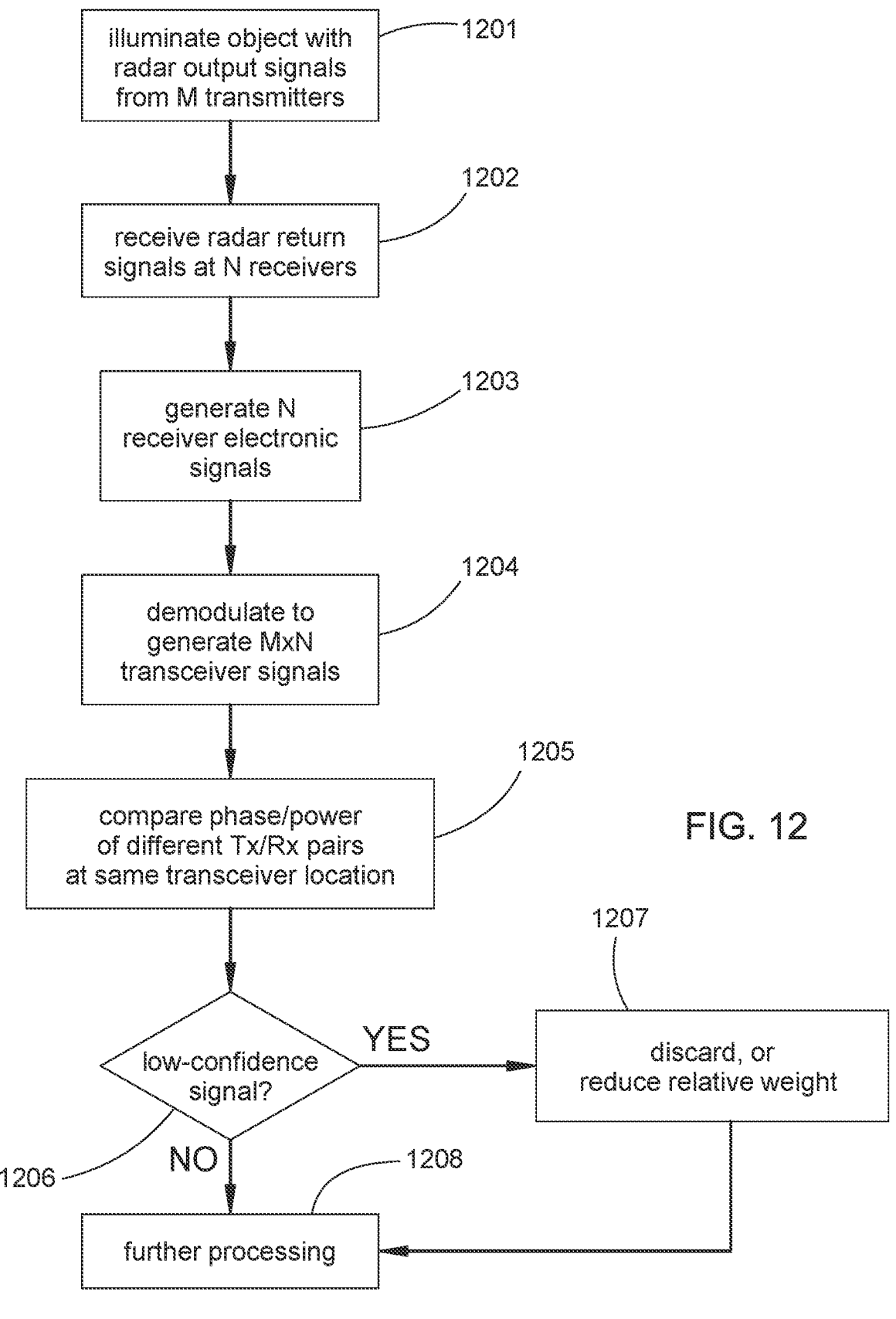
FIG. 12 is a flowchart illustrating a first example of a method for using the disclosed MIMO radar apparatus.

A general procedure for using the disclosed MIMO radar apparatus to acquire estimated angular positions, and to identify low-confidence estimated angular positions based on phase or power differences between virtual transceiver signals arising from different transmitter/receiver pairs defining the same virtual transceiver position, is illustrated in the flow chart of FIG. 12. At 1201 one or more objects are illuminated with radar output signals from the M radar transmitters T1, T2, etc. At 1202 return signals are received at the N radar receivers R1, R2, etc. At 1203 N receiver electronic signals are generated, and at 1204 are demodulated to produce M×N transceiver signals. At 1205 phase and/or power of transceiver signals arising from different transmitter/receiver pairs having the same virtual transceiver location are compared. At 1206 a determination is made, based on the comparison at 1205, as to whether the corresponding estimated angular position is low-confidence. If NO, then it can be included in further processing at 1208; if YES, then at 1207 it can be discarded or reduced in relative weight for the further processing at 1208.

Figure 13A:
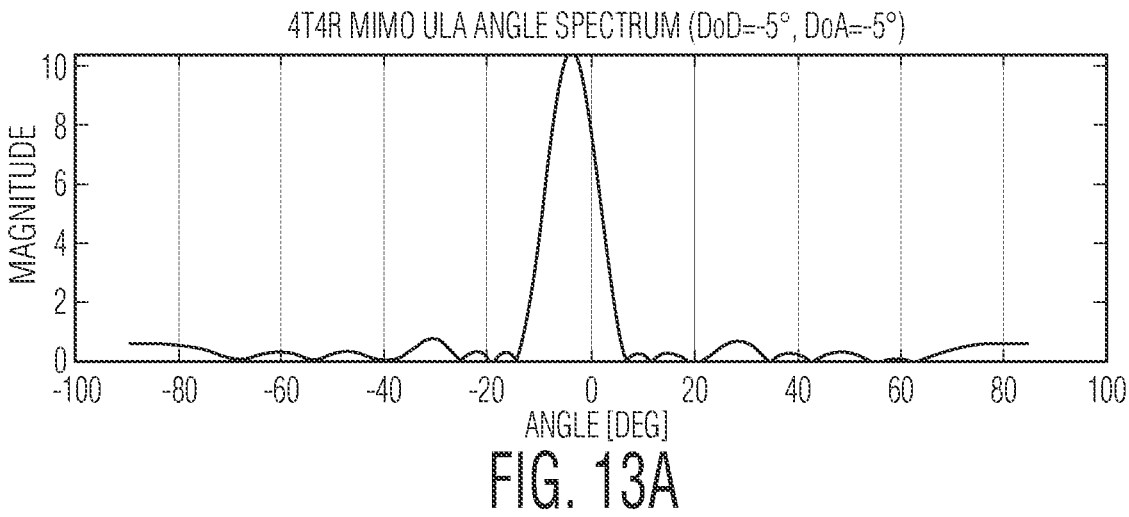
FIGS. 13A, 13B, and 13C are spatial spectra of virtual transceiver signals for differing combinations of DoD and DoA.
Figure 13B:
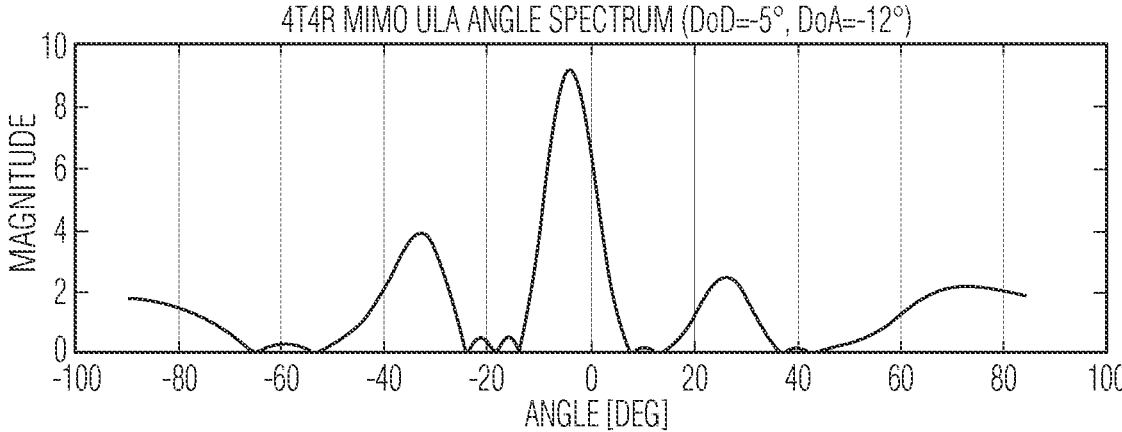
Figure 13C:
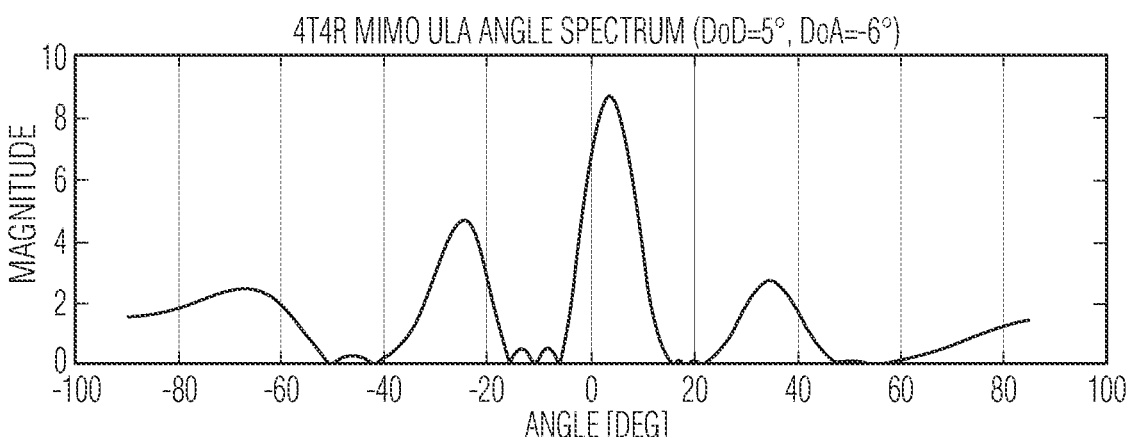

Instead, or in addition, virtual transceiver signals arising from multipath propagation can in some examples be indicated by characteristics of spatial spectra (e.g., obtained by fast Fourier transform (FFT) of the virtual transceiver signals as a function of virtual transceiver position), or by differences or correlations between spatial spectra of two different arrays of virtual transceivers. FIGS. 13A-13C are plots of uniform linear array (ULA) angle spectra arising from the arrangement of FIGS. 5A-5D. The plot of FIG. 13A (DoD=DoA=−5°) exhibits a single strong peak with only negligibly small side lobes, which can be indicative of the spectrum including radar signals arising from only direct-path propagation. FIGS. 13B (DoD=−5°; DoA=−12°) and 13C (DoD=5°; DoA=−6°) exhibit significant side lobes, which can serve as an indicator that the spectrum includes at least some radar signals arising from multipath propagation. On that basis, at least some estimated angular positions generated using signals arising from multipath radar propagation can be classified as low-confidence and discarded or reduced in relative weight.

Figures 14A, 14B, 14C:
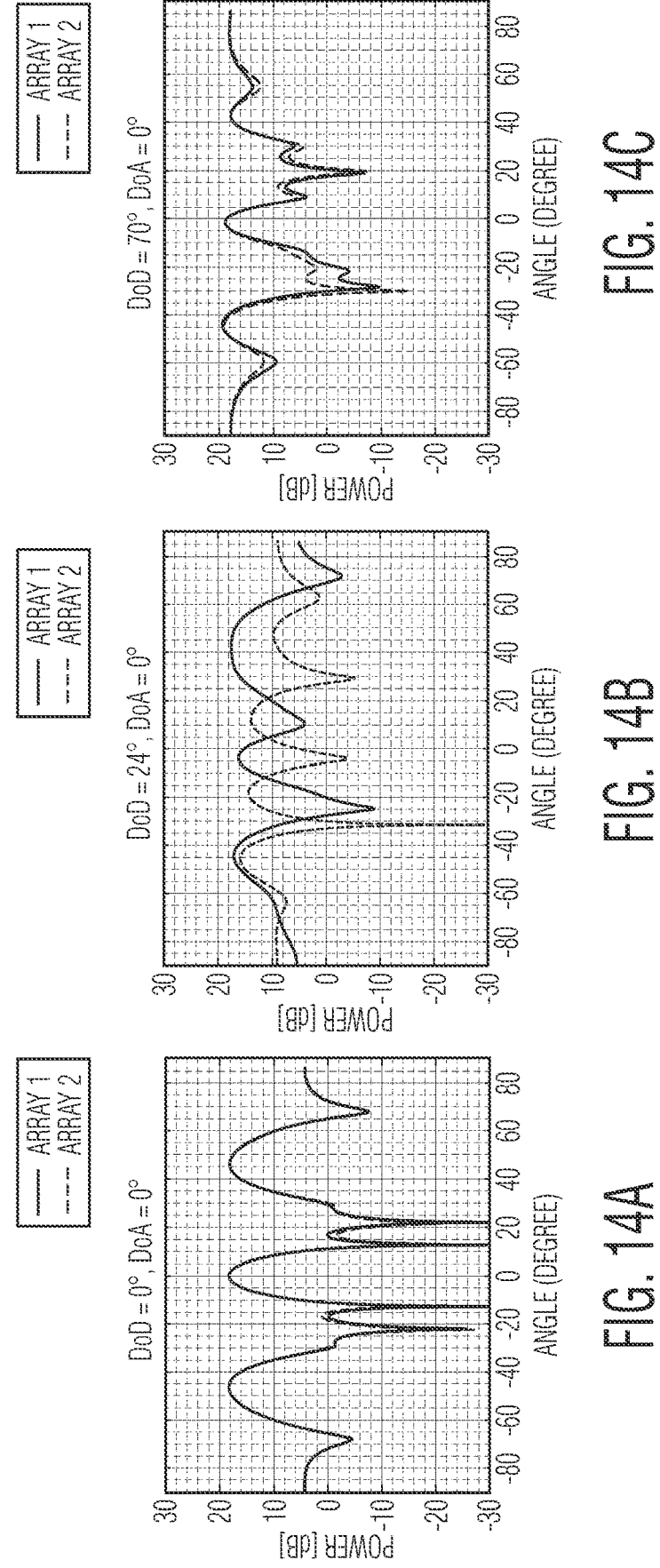
FIGS. 14A, 14B, and 14C are spatial spectra of virtual transceiver signals for two different arrays of virtual transceivers for differing combinations of DoD and DoA.
Figures 16A, 16B, 16C:
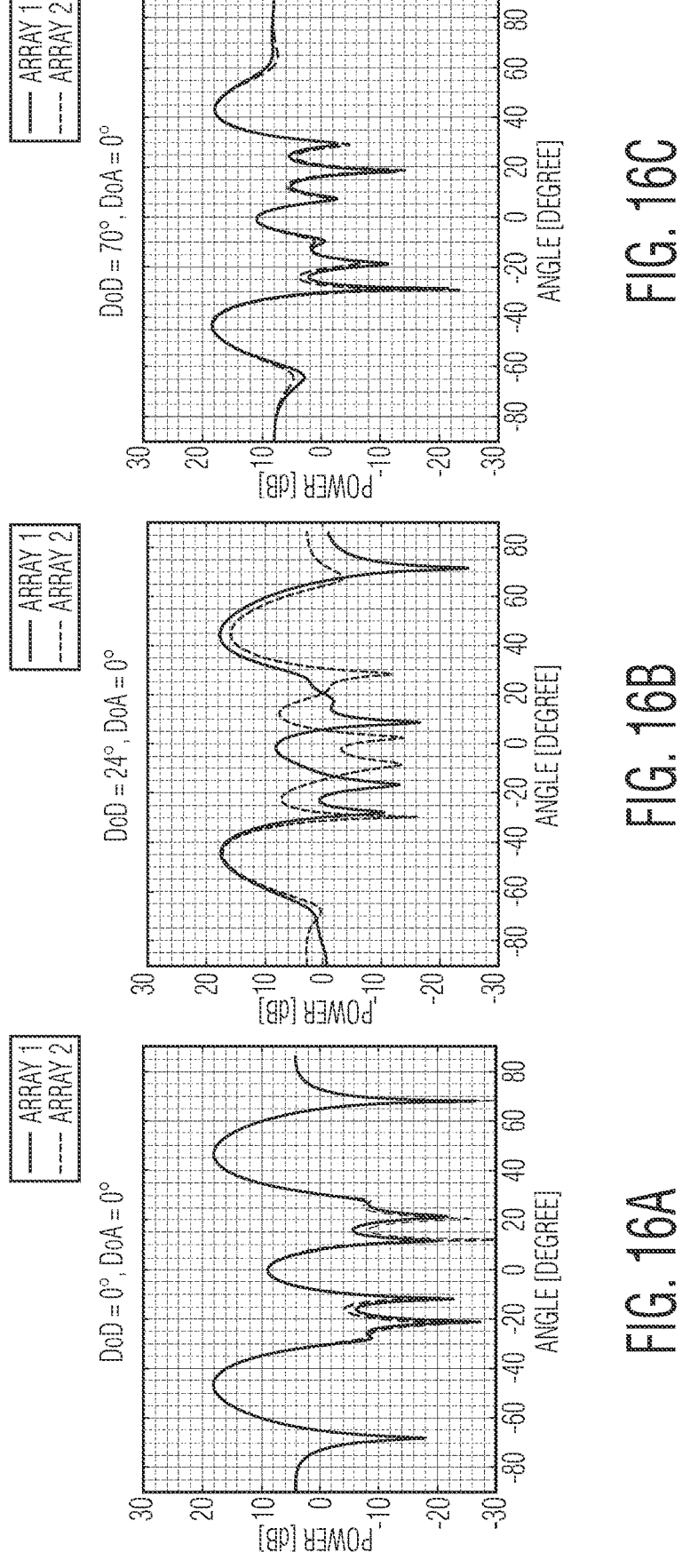
FIGS. 16A, 16B, and 16C are spatial spectra of virtual transceiver signals for two different arrays of virtual transceivers for differing combinations of DoD and DoA.

In FIGS. 14A-14C (strong multipath signals) and 16A-16C (weak multipath signals) are plotted spatial spectra (e.g., obtained by FFT) of virtual transceiver signals of two different arrays of virtual transceivers of the arrangement of FIGS. 4A-4D. A first array (array 1) of virtual transceivers includes the sequence T1R1/T1R2/T1R3/T1R4/T2R1/T2R2/T2R3/T2R4/T3R3/T3R4; a second array (array 2) of virtual transceivers includes the sequence T1R1/T1R2/T1R3/T1R4/T2R1/T2R2/T3R1/T3R2/T3R3/T3R4. Those two sequences occupy the same set of virtual transceiver positions, but differ with respect to one or more transmitter/receiver pairs that produce corresponding virtual transceiver signals. In this example, the virtual transceivers T2R3 and T2R4 in the first array are replaced by T3R1 and T3R2 in the second array. Spatial spectra of the two arrays are plotted in FIGS. 14A-14C and 16A-16C for DoD=DoA=0° (FIGS. 14A and 16A), DoD=24° and DoA=0° (FIGS. 14B and 16B), and DoD=70° and DoA=0° (FIGS. 14C and 16C).

Figures 15A, 15B:
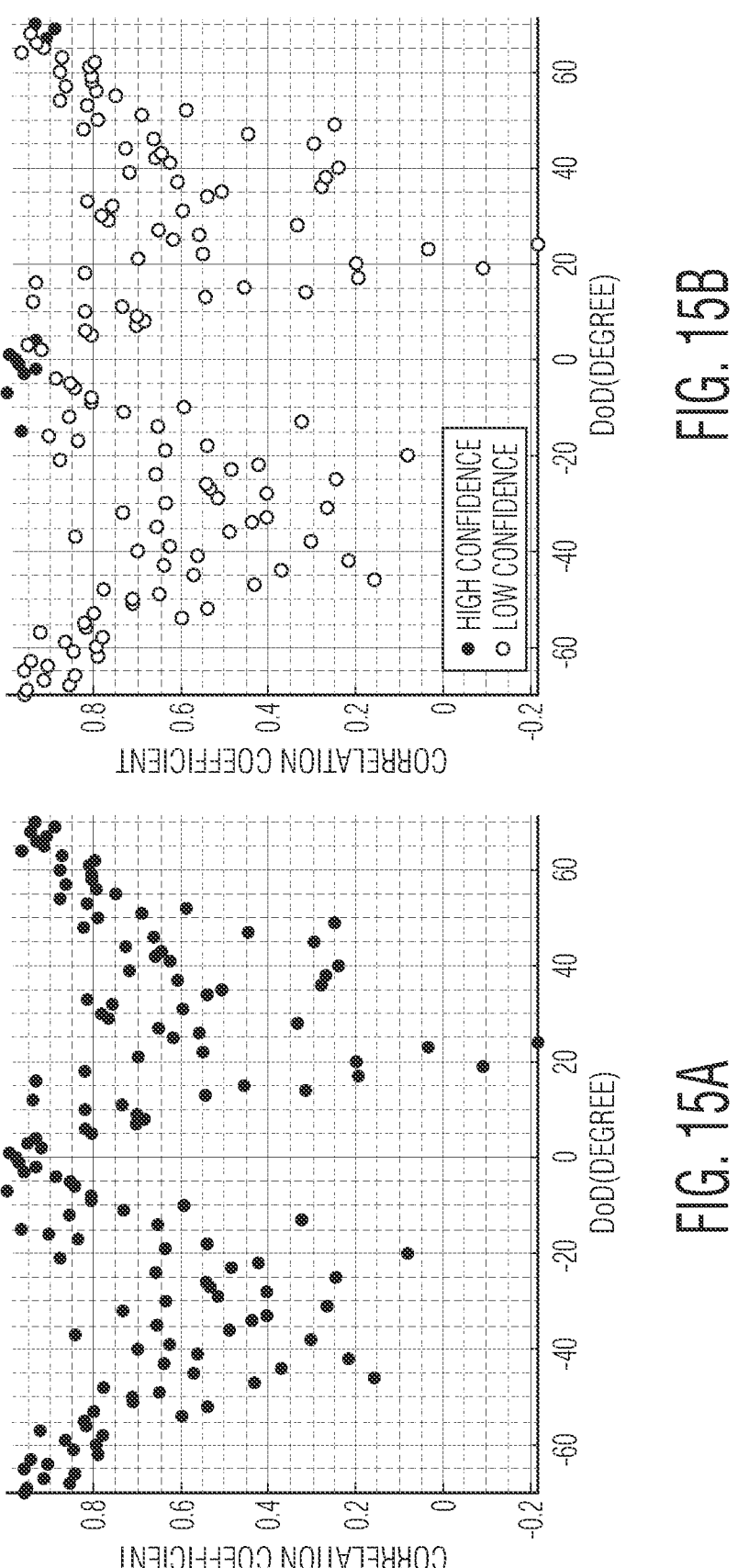
FIGS. 15A and 15B are plots of correlation coefficients of the spatial spectra of virtual transceiver signals as a function of DoD for fixed DoA.
Figures 17A, 17B:
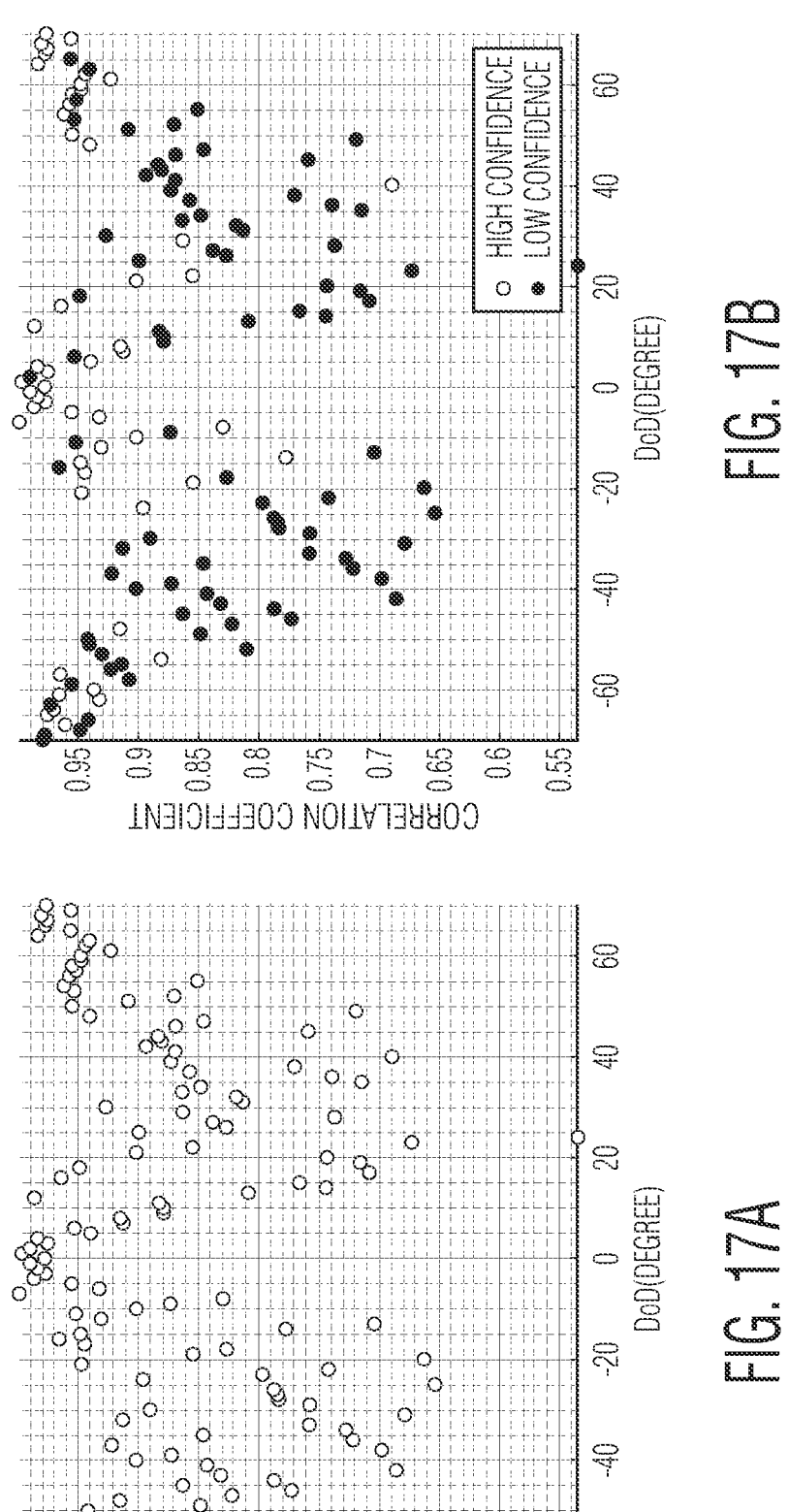
FIGS. 17A and 17B are plots of correlation coefficients of the spatial spectra of virtual transceiver signals as a function of DoD for fixed DoA.

Correlation coefficients between the two spectra are plotted in FIGS. 15A and 15B (strong multipath signals) and FIGS. 17A and 17B (weak multipath signals). It can be readily appreciated from those plots the difference between the two spatial spectra increase with increasing difference between DoD and DoA (i.e., with multipath propagation), and that correlation between those spatial spectra decreases. Either or both of those tendencies can be employed to determine a suitable threshold for differences between the spectra, or for lack of correlation between the spectra, that result in the corresponding estimated angular position being classified as low-confidence and then discarded or reduced in relative weight. Suitable thresholds or criteria can be established by illuminating real or simulated test objects with real or simulated radar output signals and calculating spatial spectra, as well as differences or correlations, on the basis of real or simulated radar return signals of the real of simulated radar output signals. In FIGS. 15B and 17B some of the correlations are deemed to indicate a high-confidence signal (i.e., relatively unlikely to have arisen from multipath propagation), while other correlations are deemed to indicate a low-confidence signal (i.e., relatively likely to have arisen from multipath propagation).

Figure 18:
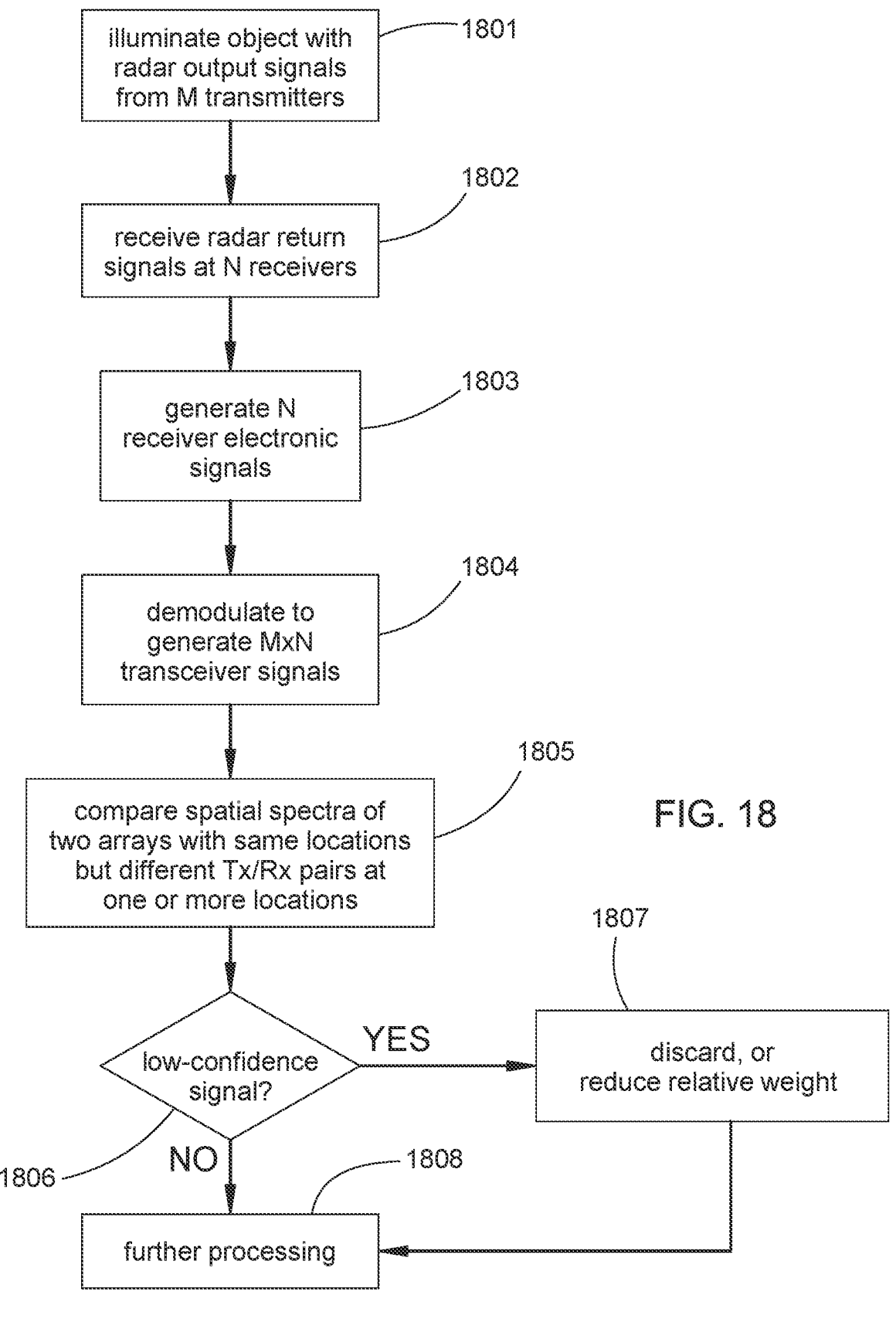
FIG. 18 is a flowchart illustrating a second example of a method for using the disclosed MIMO radar apparatus.

A general procedure for using the disclosed MIMO radar apparatus to acquire angular position estimates, and to identify low-confidence estimates based on differences between spatial spectra of arrays of virtual transceivers that occupy the same virtual transceiver positions but include signals from at least one position arising from different transmitter/receiver pairs, is illustrated in the flow chart of FIG. 18. At 1801 one or more objects are illuminated with radar output signals from the M radar transmitters T1, T2, etc. At 1802 return signals are received at the N radar receivers R1, R2, etc. At 1803 N receiver electronic signals are generated, and at 1804 are demodulated to produce M×N transceiver signals. At 1805 spatial spectra of two arrays are compared, the two arrays having the same set of virtual transceiver positions but differing with respect to the transmitter/receiver pair at one or more of the virtual transceiver positions. At 1806 a determination is made, based on the comparison at 1805, as to whether the corresponding estimated angular position is low-confidence. If NO, then it can be included in further processing at 1808; if YES, then at 1807 it can be discarded or reduced in relative weight for the further processing at 1808.

Instead of, or in addition to, calculations or measurements to determine suitable threshold or criteria for deciding whether a set of signals is high- or low-confidence, machine learning (ML) or artificial intelligence (AI) algorithms can be employed in some examples. In such instances, real or simulated virtual transceiver signals (as described above) can be employed for training the ML or AI algorithm to distinguish between high- and low-confidence radar signal and the resulting estimated angular positions.

The inventive arrangement of radar transmitters and receivers described above, and corresponding inventive methods of use thereof, can be employed in any suitable MIMO radar system wherein the radar transmitters are operated simultaneously to transmit their corresponding radar output signals. Examples of such suitable MIMO radar systems can include those having radar MCU 104 and radar device 102 configured to operate the radar transmitters and receivers as (i) a code division multiplexed (CDM) MIMO radar system, (ii) a frequency division multiplexed (FDM) MIMO radar system, or (iii) a Doppler division multiplexed (DDM) MIMO radar system. A MIMO radar system incorporating the inventive arrangements disclosed, and operated according to the disclosed inventive methods, can be incorporated into advanced driver assistant system (ADAS).

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. A multiple-input multiple-output (MIMO) radar apparatus comprising: radar control circuitry; a set of M radar transmitters operably coupled to the radar control circuitry; and a set of N radar receivers operably coupled to the radar control circuitry, wherein: corresponding relative positions of the M radar transmitters and the N radar receivers define a set of M×N virtual transceiver positions, each virtual transceiver position corresponding to at least one of M×N transmitter/receiver pairs; at least one of the transmitter/receiver pairs defines one of the corresponding virtual transceiver positions that spatially coincides with the corresponding virtual transceiver position defined by a second one of the transmitter/receiver pairs different from the first transmitter/receiver pair; and the radar control circuitry is configured to (i) transmit simultaneously via each of the M radar transmitters a corresponding one of M radar output signals, (ii) receive via the N radar receivers corresponding radar return signals arising from the M simultaneously transmitted radar output signals, and (iii) generate from the radar return signals N corresponding electronic receiver signals.

Example 2. The MIMO radar apparatus of Example 1 wherein the radar control circuitry is configured to: (a) generate, from the N electronic receiver signals, M×N virtual transceiver signals, each virtual transceiver signal corresponding to one of the M×N virtual transceiver positions and arising from the corresponding transmitter/receiver pair; (b) generating, using the M×N virtual transceiver signals, estimated angular positions of one or more objects; (c) determine differences or correlations of one or more signal characteristics between two or more of the virtual transceiver signals, two or more of which (i) correspond to the same virtual transceiver position and (ii) arise from different corresponding radar transmitter/receiver pairs; and (d) classify as a low-confidence estimated angular position each of the estimated angular positions that is generated using virtual transceiver signals for which one or more determined differences or correlations exceed one or more corresponding predetermined thresholds or meet one or more corresponding predetermined criteria.

Example 3. The MIMO radar apparatus of Example 2 wherein the radar control circuitry is configured to discard each estimated angular position that is classified as a low-confidence estimated angular position.

Example 4. The MIMO radar apparatus of Example 2 wherein the radar control circuitry is configured to generate an indicator of a reduced relative weight for subsequent processing for each estimated angular position that is classified as a low-confidence estimated angular position.

Example 5. The MIMO radar apparatus of any one of Examples 1 through 4 wherein the radar control circuitry is configured to: determine a difference between the measured phases, amplitudes, or powers of (i) a first one of the virtual transceiver signals corresponding to a first one of the virtual transceiver positions and arising from a corresponding first one of the transmitter/receiver pairs and (ii) a second one of the virtual transceiver signals corresponding to a second one of the virtual transceiver positions, coinciding with the first virtual transceiver position, and arising from a second corresponding transmitter/receiver pair different from the first transmitter/receiver pair; and classify as a low-confidence estimated angular position each of the estimated angular positions that is generated using the first and second virtual transceiver signals and for which the determined difference exceeds a corresponding predetermined threshold.

Example 6. The MIMO radar apparatus of Example 5 wherein the determined difference that exceeds the corresponding predetermined threshold results from (i) one or more of the radar return signals arising from propagation of the corresponding radar output signal and the corresponding radar return signal outside a selected field-of-view (FOV) of the MIMO radar apparatus, or (ii) one or more of the radar return signals arising from multipath propagation of the corresponding radar return signal or the corresponding radar output signal.

Example 7. The MIMO radar apparatus of any one of Examples 5 or 6 wherein one or more of the predetermined thresholds is derived from real or simulated virtual receiver test signals produced from radar return signals arising from real or simulated radar output signals illuminating one or more real or simulated test objects at known corresponding angular positions.

Example 8. The MIMO radar apparatus of Example 7 wherein one or more of the derived predetermined thresholds is a selected multiple of a standard deviation σ of the real or simulated virtual receiver test signals.

Example 9. The MIMO radar apparatus of any one of Examples 1 through 8 wherein the radar control circuitry is configured to: (i) generate a first spatial spectrum from the virtual receiver signals from a first subset of the virtual transceivers at a first subset of the virtual transceiver positions; (ii) generate a second spatial spectrum from the virtual receiver signals from a second subset of the virtual transceivers at a second subset of the virtual transceiver positions, the first and second subsets of the virtual transceiver positions being the same, the first and second subsets of the virtual transceivers differing with respect to at least one corresponding transmitter/receiver pair; (iii) determine a difference or correlation between the generated first and second spatial spectra; and (iv) classify as a low-confidence estimated angular position each of the estimated angular positions that is generated using the virtual transceiver signals of the first or second subsets of virtual transceiver signals and for which the determined difference exceeds one or more predetermined thresholds or for which the spectra or correlation meets one or more predetermined criteria.

Example 10. The MIMO radar apparatus of Example 7 wherein the determined difference that exceeds one or more of the predetermined thresholds or the correlation or spectra that meet one or more of the predetermined criteria results from one or more of the radar return signals arising from multipath propagation of the corresponding radar return signal or the corresponding radar output signal.

Example 11. The MIMO radar apparatus of any one of Examples 2 through 10 wherein the one or more of the predetermined criteria is classification as a low-confidence estimate by an artificial intelligence (AI) algorithm or a machine learning (ML) algorithm, the AI or ML algorithm having been trained on a set of real or simulated virtual receiver test signals produced from the radar return signals arising from real or simulated radar output signals illuminating one or more real or simulated test objects at known corresponding angular positions.

Example 12. The MIMO radar apparatus of any one of Examples 1 through 11 wherein the radar control circuitry is configured to operate the radar transmitters and receivers as (i) a code division multiplexed (CDM) MIMO radar system, (ii) a frequency division multiplexed (FDM) MIMO radar system, or (iii) a Doppler division multiplexed (DDM) MIMO radar system.

Example 13. The MIMO radar apparatus of any one of Examples 1 through 12 wherein the M radar transmitters, the N radar receivers, and the radar control circuitry are incorporated into an advanced driver assistant system (ADAS).

Example 14. A method for operating the MIMO radar apparatus of any one of Examples 1 through 13, the method comprising: using the radar control circuitry to transmit simultaneously via each one of the set of M radar transmitters the corresponding one of M radar output signals; and using the radar control circuitry to receive via the set of N radar receivers corresponding radar return signals arising from the M simultaneously transmitted radar output signals; and using the radar control circuitry to generate from the radar return signals the N corresponding electronic receiver signals.

Example 15. A method for operating a multiple-input multiple-output (MIMO) radar apparatus, the method comprising: using radar control circuitry to transmit simultaneously via each one of a set of M radar transmitters a corresponding one of M radar output signals; and using the radar control circuitry to receive via a set of N radar receivers corresponding radar return signals arising from the M simultaneously transmitted radar output signals; and using the radar control circuitry to generate from the radar return signals N corresponding electronic receiver signals, wherein: corresponding relative positions of the M radar transmitters and the N radar receivers define a set of M×N virtual transceiver positions, each virtual transceiver position corresponding to at least one of M×N transmitter/receiver pairs; and at least one of the transmitter/receiver pairs defines one of the corresponding virtual transceiver positions that spatially coincides with the corresponding virtual transceiver position defined by a second one of the transmitter/receiver pairs different from the first transmitter/receiver pair.

Example 16. The method of any one of Examples 14 or 15 further comprising, using the radar control circuitry: (a) generating, from the N electronic receiver signals, M×N virtual transceiver signals, each virtual transceiver signal corresponding to one of the M×N virtual transceiver positions and arising from the corresponding transmitter/receiver pair; (b) generating, from the M×N virtual transceiver signals, estimated angular positions of one or more objects; (c) determining differences of one or more signal characteristics between two or more of the virtual transceiver signals, two or more of which (i) correspond to the same virtual transceiver position and (ii) arise from different corresponding radar transmitter/receiver pairs; and (d) classifying as a low-confidence estimated angular position each of the estimated angular positions that is generated using virtual transceiver signals for which one or more determined differences or correlations exceed one or more corresponding predetermined thresholds or meet one or more corresponding predetermined criteria.

Example 17. The method of Example 16 further comprising discarding each estimated angular position that is classified as a low-confidence estimated angular position.

Example 18. The method of Example 16 further comprising generating an indicator of a reduced relative weight for subsequent processing for each estimated angular position that is classified as a low-confidence estimated angular position.

Example 19. The method of any one of Examples 14 through 18 further comprising, using the radar control circuitry: determining a difference between the measured phases, amplitudes, or powers of (i) a first one of the virtual transceiver signals corresponding to a first one of the virtual transceiver positions and arising from a corresponding first one of the transmitter/receiver pairs and (ii) a second one of the virtual transceiver signals corresponding to a second one of the virtual transceiver positions, coinciding with the first virtual transceiver position, and arising from a second corresponding transmitter/receiver pair different from the first transmitter/receiver pair; and classifying as a low-confidence estimated angular position each of the estimated angular positions that is generated using the first and second virtual transceiver signals and for which the determined difference exceeds a corresponding predetermined threshold.

Example 20. The method of Example 19 wherein the determined difference that exceeds the corresponding predetermined threshold results from (i) one or more of the radar return signals arising from propagation of the corresponding radar output signal and the corresponding radar return signal outside a selected field-of-view (FOV) of the MIMO radar apparatus, or (ii) one or more of the radar return signals arising from multipath propagation of the corresponding radar return signal or the corresponding radar output signal.

Example 21. The method of any one of Examples 19 or 20 further comprising illuminating with real or simulated radar output signals one or more real or simulated test objects at known corresponding angular positions, and deriving one or more of the predetermined thresholds from real or simulated virtual receiver test signals produced from the radar return signals arising from the real or simulated radar output signals, one or more of the derived predetermined thresholds being a selected multiple of a standard deviation σ of the virtual receiver test signals.

Example 22. The method of any one of Examples 14 through 21 further comprising, using the radar control circuitry: (i) generating a first spatial spectrum from the virtual receiver signals from a first subset of the virtual transceivers at a first subset of the virtual transceiver positions; (ii) generating a second spatial spectrum from the virtual receiver signals from a second subset of the virtual transceivers at a second subset of the virtual transceiver positions, the first and second subsets of the virtual transceiver positions being the same, the first and second subsets of the virtual transceivers differing with respect to at least one corresponding transmitter/receiver pair; (iii) determining a difference or correlation between the generated first and second spatial spectra; and (iv) classifying as a low-confidence estimated angular position each of the estimated angular positions that is generated using the virtual transceiver signals of the first or second subsets of virtual transceiver signals and for which the determined difference exceeds one or more corresponding predetermined thresholds or for which the spectra or correlation meet one or more predetermined criteria.

Example 23. The method of Example 22 wherein the determined difference that exceeds one or more of the corresponding predetermined thresholds or meets one or more of the predetermined criteria results from one or more of the radar return signals arising from multipath propagation of the corresponding radar return signal or the corresponding radar output signal.

Example 24. The method of any one of Examples 14 through 23 further comprising illuminating with real or simulated radar output signals one or more real or simulated test objects at known corresponding angular positions, and training an artificial intelligence (AI) algorithm or a machine learning (ML) algorithm on a set of real or simulated virtual receiver test signals produced from the radar return signals arising from the real or simulated radar output signals, to classify certain estimated angular positions as low-confidence estimated angular positions.

Example 25. The method of any one of Examples 14 through 24 further comprising operating the radar transmitters and receivers as (i) a code division multiplexed (CDM) MIMO radar system, (ii) a frequency division multiplexed (FDM) MIMO radar system, or (iii) a Doppler division multiplexed (DDM) MIMO radar system.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open-ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth, or if a differing interpretation is implicit or inherent (e.g., some small integer quantities). For null quantities described by phrases such as "equal to zero," "absent," "eliminated," "negligible," "prevented," and so forth (with or without terms such as "about," "substantially," and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as "parallel," "perpendicular," "orthogonal," "flush," "aligned," "spatially coinciding," and so forth shall be similarly interpreted (with or without terms such as "about," "substantially," and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A multiple-input multiple-output (MIMO) radar apparatus comprising:
   radar control circuitry;
   a set of M radar transmitters operably coupled to the radar control circuitry; and
   a set of N radar receivers operably coupled to the radar control circuitry,
   wherein corresponding relative positions of the M radar transmitters and the N radar receivers define a set of M×N virtual transceiver positions, each virtual transceiver position corresponding to at least one of M×N transmitter/receiver pairs;
   wherein at least one of the transmitter/receiver pairs defines one of the corresponding virtual transceiver positions that spatially coincides with the corresponding virtual transceiver position defined by a second one of the transmitter/receiver pairs different from the first transmitter/receiver pair; and
   wherein the radar control circuitry is configured to:
      transmit simultaneously via each of the M radar transmitters a corresponding one of M radar output signals,
      receive via the N radar receivers corresponding radar return signals arising from the M simultaneously transmitted radar output signals, and
      generate from the radar return signals N corresponding electronic receiver signals.

2. The MIMO radar apparatus of claim 1 wherein the radar control circuitry is configured to:
   generate, from the N electronic receiver signals, M×N virtual transceiver signals, each virtual transceiver signal corresponding to one of the M×N virtual transceiver positions and arising from the corresponding transmitter/receiver pair;

generate, using the M×N virtual transceiver signals, estimated angular positions of one or more objects;

determine differences or correlations of one or more signal characteristics between two or more of the virtual transceiver signals, two or more of which (i) correspond to the same virtual transceiver position and (ii) arise from different corresponding radar transmitter/receiver pairs; and classify as a low-confidence estimated angular position each of the estimated angular positions that is generated using virtual transceiver signals for which one or more of the determined differences or correlations exceed one or more corresponding predetermined thresholds or meet one or more corresponding predetermined criteria.

3. The MIMO radar apparatus of claim 2 wherein the radar control circuitry is configured to discard each estimated angular position that is classified as a low-confidence estimated angular position.

4. The MIMO radar apparatus of claim 2 wherein the radar control circuitry is configured to generate an indicator of a reduced relative weight for subsequent processing for each estimated angular position that is classified as a low-confidence estimated angular position.

5. The MIMO radar apparatus of claim 1 wherein the radar control circuitry is configured to:

determine a difference between the measured phases, amplitudes, or powers of (i) a first one of the virtual transceiver signals corresponding to a first one of the virtual transceiver positions and arising from a corresponding first one of the transmitter/receiver pairs and (ii) a second one of the virtual transceiver signals corresponding to a second one of the virtual transceiver positions, coinciding with the first virtual transceiver position, and arising from a second corresponding transmitter/receiver pair different from the first transmitter/receiver pair; and classify as a low-confidence estimated angular position each of the estimated angular positions that is generated using the first and second virtual transceiver signals and for which the determined difference exceeds a corresponding predetermined threshold.

6. The MIMO radar apparatus of claim 5 wherein the determined difference that exceeds the corresponding predetermined threshold results from (i) one or more of the radar return signals arising from propagation of the corresponding radar output signal and the corresponding radar return signal outside a selected field-of-view (FOV) of the MIMO radar apparatus, or (ii) one or more of the radar return signals arising from multipath propagation of the corresponding radar return signal or the corresponding radar output signal.

7. The MIMO radar apparatus of claim 5 wherein one or more of the predetermined thresholds is derived from real or simulated virtual receiver test signals produced from radar return signals arising from real or simulated radar output signals illuminating one or more real or simulated test objects at known corresponding angular positions.

8. The MIMO radar apparatus of claim 7 wherein one or more of the derived predetermined thresholds is a selected multiple of a standard deviation σ of the real or simulated virtual receiver test signals.

9. The MIMO radar apparatus of claim 1 wherein the radar control circuitry is configured to:

generate a first spatial spectrum from the virtual receiver signals from a first subset of the virtual transceivers at a first subset of the virtual transceiver positions;

generate a second spatial spectrum from the virtual receiver signals from a second subset of the virtual transceivers at a second subset of the virtual transceiver positions, the first and second subsets of the virtual transceiver positions being the same, the first and second subsets of the virtual transceivers differing with respect to at least one corresponding transmitter/receiver pair;

determine a difference or correlation between the generated first and second spatial spectra; and classify as a low-confidence estimated angular position each of the estimated angular positions that is generated using the virtual transceiver signals of the first or second subsets of virtual transceiver signals and for which the determined difference exceeds one or more predetermined thresholds or for which the spectra or correlation meet one or more predetermined criteria.

10. The MIMO radar apparatus of claim 9 wherein the determined difference that exceeds one or more of the corresponding predetermined thresholds or the correlation or spectra that meet one or more of the predetermined criteria results from one or more of the radar return signals arising from multipath propagation of the corresponding radar return signal or the corresponding radar output signal.

11. A method for operating a multiple-input multiple-output (MIMO) radar apparatus, the method comprising:

using radar control circuitry to transmit simultaneously via each one of a set of M radar transmitters a corresponding one of M radar output signals; and using the radar control circuitry to receive via a set of N radar receivers corresponding radar return signals arising from the M simultaneously transmitted radar output signals; and using the radar control circuitry to generate from the radar return signals N corresponding electronic receiver signals, wherein corresponding relative positions of the M radar transmitters and the N radar receivers define a set of M×N virtual transceiver positions, each virtual transceiver position corresponding to at least one of M×N transmitter/receiver pairs; and wherein at least one of the transmitter/receiver pairs defines one of the corresponding virtual transceiver positions that spatially coincides with the corresponding virtual transceiver position defined by a second one of the transmitter/receiver pairs different from the first transmitter/receiver pair.

12. The method of claim 11 further comprising, using the radar control circuitry:

generating, from the N electronic receiver signals, M×N virtual transceiver signals, each virtual transceiver signal corresponding to one of the M×N virtual transceiver positions and arising from the corresponding transmitter/receiver pair;

generating, using the M×N virtual transceiver signals, estimated angular positions of one or more objects;

determining differences or correlations of one or more signal characteristics between two or more of the virtual transceiver signals, two or more of which (i) correspond to the same virtual transceiver position and (ii) arise from different corresponding radar transmitter/receiver pairs; and classifying as a low-confidence estimated angular position each of the estimated angular positions that is generated using virtual transceiver signals for which one or more of the determined differences or correlations exceed one or more corresponding predetermined thresholds or meet one or more corresponding predetermined criteria.

13. The method of claim 12 further comprising discarding each estimated angular position that is classified as a low-confidence estimated angular position.

14. The method of claim 12 further comprising generating an indicator of a reduced relative weight for subsequent processing for each estimated angular position that is classified as a low-confidence estimated angular position.

15. The method of claim 12 further comprising illuminating with real or simulated radar output signals one or more real or simulated test objects at known corresponding angular positions, and training an artificial intelligence (AI) algorithm or a machine learning (ML) algorithm on a set of real or simulated virtual receiver test signals produced from the radar return signals arising from the real or simulated radar output signals, to classify certain estimated angular positions as low-confidence estimated angular positions.

16. The method of claim 11 further comprising, using the radar control circuitry:

determining a difference between the measured phases, amplitudes, or powers of (i) a first one of the virtual transceiver signals corresponding to a first one of the virtual transceiver positions and arising from a corresponding first one of the transmitter/receiver pairs and (ii) a second one of the virtual transceiver signals corresponding to a second one of the virtual transceiver positions, coinciding with the first virtual transceiver position, and arising from a second corresponding transmitter/receiver pair different from the first transmitter/receiver pair; and classifying as a low-confidence estimated angular position each of the estimated angular positions that is generated using the first and second virtual transceiver signals and for which the determined difference exceeds a corresponding predetermined threshold.

17. The method of claim 16 wherein the determined difference that exceeds the corresponding predetermined threshold results from (i) one or more of the radar return signals arising from propagation of the corresponding radar output signal and the corresponding radar return signal outside a selected field-of-view (FOV) of the MIMO radar apparatus, or (ii) one or more of the radar return signals arising from multipath propagation of the corresponding radar return signal or the corresponding radar output signal.

18. The method of claim 16 further comprising illuminating with real or simulated radar output signals one or more real or simulated test objects at known corresponding angular positions, and deriving one or more of the predetermined thresholds from real or simulated virtual receiver test signals produced from the radar return signals arising from the real or simulated radar output signals, one or more of the derived predetermined thresholds being a selected multiple of a standard deviation σ of the virtual receiver test signals.

19. The method of claim 11 further comprising, using the radar control circuitry:

generating a first spatial spectrum from the virtual receiver signals from a first subset of the virtual transceivers at a first subset of the virtual transceiver positions;

generating a second spatial spectrum from the virtual receiver signals from a second subset of the virtual transceivers at a second subset of the virtual transceiver positions, the first and second subsets of the virtual transceiver positions being the same, the first and second subsets of the virtual transceivers differing with respect to at least one corresponding transmitter/receiver pair;

determining a difference or correlation between the generated first and second spatial spectra; and classifying as a low-confidence estimated angular position each of the estimated angular positions that is generated using the virtual transceiver signals of the first or second subsets of virtual transceiver signals and for which the determined difference exceeds one or more corresponding predetermined thresholds or for which the spectra or correlation meet one or more predetermined criteria.

20. The method of claim 19 wherein the determined difference that exceeds one or more of the corresponding predetermined thresholds or meets one or more of the predetermined criteria results from one or more of the radar return signals arising from multipath propagation of the corresponding radar return signal or the corresponding radar output signal.

* * * * *